US012724752B2

(12) United States Patent
Galvin et al.

(10) Patent No.: US 12,724,752 B2
(45) **Date of Patent: *Sep. 1, 2026**

(54) SYSTEM AND METHOD FOR GENERATING THOUGHTS WITH LARGE LANGUAGE MODELS USING CODEWORDS

(71) Applicant: AtomBeam Technologies Inc., Moraga, CA (US)

(72) Inventors: Brian Galvin, Silverdale, WA (US); Alan McCord, Forney, TX (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/397,339

(22) Filed: Nov. 21, 2025

(65) Prior Publication Data

US 2026/0079897 A1 Mar. 19, 2026

Related U.S. Application Data

(63) Continuation of application No. 19/094,850, filed on Mar. 29, 2025, now Pat. No. 12,541,488, which is a continuation-in-part of application No. 18/791,465, filed on Aug. 1, 2024, now Pat. No. 12,271,696, (Continued)

(51) Int. Cl.

*G06F 16/00* (2019.01)
*G06F 16/21* (2019.01)
*G06F 40/284* (2020.01)
*G06F 40/30* (2020.01)

(52) U.S. Cl.

CPC .......... *G06F 16/212* (2019.01); *G06F 40/284* (2020.01); *G06F 40/30* (2020.01)

(58) Field of Classification Search

CPC ..... G06F 16/3329; G06F 40/284; G06F 40/30
See application file for complete search history.

(56) References Cited

U.S. PATENT DOCUMENTS 11,893,057 B2 2/2024 Donaldson et al.
11,893,981 B1 2/2024 Clark et al.
11,934,792 B1 3/2024 Adato et al.

(Continued)

FOREIGN PATENT DOCUMENTS

CN 117371453 A 1/2024
CN 119312910 A * 1/2025 ........... G06F 40/289

(Continued)

*Primary Examiner* — Alexander Khong
(74) *Attorney, Agent, or Firm* — GALVIN PATENT LAW LLC; Brian R. Galvin

(57) ABSTRACT

This invention presents an optimized approach for training and operating Large Language Models (LLMs) using codewords. By converting traditional token-based LLMs to codeword-based systems, the method achieves significant efficiency gains. The process involves tokenizing training data and assigning codewords to tokens. LLMs are then trained and operated using these compact codewords instead of conventional tokens. During operation, prompts are converted to codewords, processed by the LLM, and the outputs are converted back to text. This approach reduces the overall cost of training and operating LLMs by approximately, offering a more efficient solution for large-scale language processing tasks.

20 Claims, 23 Drawing Sheets

Related U.S. Application Data which is a continuation-in-part of application No. 18/736,498, filed on Jun. 6, 2024.

(60) Provisional application No. 63/651,359, filed on May 23, 2024.

(56) References Cited

U.S. PATENT DOCUMENTS

| | | | | |
|---|---|---|---|---|
| 11,954,102 | B1 | 4/2024 | Palaniappan et al. | |
| 11,977,854 | B2 | 5/2024 | Tunstall-Pedoe et al. | |
| 11,989,507 | B2 | 5/2024 | Tunstall-Pedoe et al. | |
| 11,989,527 | B2 | 5/2024 | Tunstall-Pedoe et al. | |
| 12,001,462 | B1 * | 6/2024 | Madisetti | G06F 16/3329 |
| 12,008,621 | B1 | 6/2024 | Atef | |
| 12,038,918 | B1 | 7/2024 | Zhang et al. | |
| 12,039,264 | B2 * | 7/2024 | Prasad | G06F 40/242 |
| 12,067,362 | B2 | 8/2024 | Tunstall-Pedoe et al. | |
| 12,073,180 | B2 | 8/2024 | Tunstall-Pedoe et al. | |
| 2023/0129094 | A1 | 4/2023 | Lauritzen et al. | |
| 2023/0135179 | A1 | 5/2023 | Mielke et al. | |
| 2023/0237053 | A1 | 7/2023 | Dangoor et al. | |
| 2023/0259714 | A1 | 8/2023 | Lange | |
| 2023/0262234 | A1 | 8/2023 | Amini et al. | |
| 2023/0350936 | A1 | 11/2023 | Alayrac et al. | |
| 2023/0376365 | A1 | 11/2023 | Linquist et al. | |
| 2023/0394188 | A1 | 12/2023 | Zhang et al. | |
| 2023/0421373 | A1 | 12/2023 | Ryan et al. | |
| 2024/0038226 | A1 | 2/2024 | Nouri et al. | |
| 2024/0070270 | A1 | 2/2024 | Mace et al. | |
| 2024/0070394 | A1 | 2/2024 | Peng et al. | |
| 2024/0073056 | A1 | 2/2024 | Ishchenko et al. | |
| 2024/0185137 | A1 | 6/2024 | Atlan et al. | |
| 2024/0220712 | A1 | 7/2024 | Zass | |
| 2024/0242030 | A1 | 7/2024 | Lao et al. | |
| 2024/0256582 | A1 | 8/2024 | Jain et al. | |
| 2024/0273282 | A1 | 8/2024 | Muralidharan et al. | |
| 2024/0273286 | A1 | 8/2024 | Iu et al. | |
| 2024/0273291 | A1 | 8/2024 | Smith et al. | |
| 2024/0273306 | A1 | 8/2024 | Somaiya et al. | |
| 2024/0289395 | A1 * | 8/2024 | Zhou | G06F 16/9532 |
| 2024/0289558 | A1 * | 8/2024 | Muraoka | G06F 40/40 |
| 2024/0290331 | A1 | 8/2024 | Lu et al. | |
| 2024/0296425 | A1 | 9/2024 | Rosenkranz et al. | |
| 2024/0320268 | A1 | 9/2024 | Mallipeddi | |
| 2025/0021761 | A1 * | 1/2025 | Santhanam | G06F 40/284 |
| 2025/0131261 | A1 * | 4/2025 | Harang | G06N 20/00 |
| 2025/0147737 | A1 * | 5/2025 | Maturana | G06F 8/73 |
| 2025/0165444 | A1 * | 5/2025 | Rahimov | G06F 16/215 |

FOREIGN PATENT DOCUMENTS

| | | | | |
|---|---|---|---|---|
| WO | WO-2025073037 | A1 * | 4/2025 | G06F 40/56 |
| WO | WO-2025085481 | A1 * | 4/2025 | G06N 3/09 |

* cited by examiner

SYSTEM AND METHOD FOR GENERATING THOUGHTS WITH LARGE LANGUAGE MODELS USING CODEWORDS

CROSS-REFERENCE TO RELATED APPLICATIONS

Priority is claimed in the application data sheet to the following patents or patent applications, each of which is expressly incorporated herein by reference in its entirety:

Ser. No. 19/094,850
Ser. No. 18/791,465
Ser. No. 18/736,498
63/651,359

BACKGROUND OF THE INVENTION

Field of the Art

The present invention relates to the field of artificial intelligence and machine learning, and more specifically to deep learning models for processing and generating data such as text, images, audio, and other modalities.

Discussion of the State of the Art

In recent years, deep learning models have achieved remarkable success in various domains, including natural language processing, computer vision, and speech recognition. One of the most prominent architectures in this field is the Transformer model, which has been the basis for state-of-the-art language models like BERT, GPT, and their successors.

These language models typically operate on a sequence of input tokens, which are often derived by splitting the input text into words or subwords. Each token is then mapped to a dense vector representation, known as an embedding, which captures semantic and syntactic information about the token. In many deep learning models, a transformer architecture processes these embeddings using self-attention mechanisms and feedforward neural networks to generate contextualized representations and outputs.

However, this token-based approach has several limitations. The tokenization process can be complex and may not always align with the inherent structure of the data. In many networks, the use of dense embeddings can be computationally expensive and memory-intensive, especially for large vocabularies. Additionally, the learned representations are specific to the language and domain of the training data, which can limit the model's ability to generalize to new languages or domains.

What is needed is a new neural network model that can operate at a higher level of abstraction, using more compact and expressive representations that can efficiently capture the underlying patterns in the data. It should be flexible enough to handle various data modalities beyond just text and should enable seamless transfer learning across different languages and domains.

SUMMARY OF THE INVENTION

Accordingly, the inventor has conceived and reduced to practice a system and method for generating thoughts with large language models using codewords. The large codeword model (LCM) aims to address the limitations of current approaches and unlock new possibilities for AI systems. Unlike traditional models that operate on raw tokens, LCMs work with codewords-discrete, compressed representations of the input data that capture its inherent structure and patterns. This allows LCMs to process and generate data more efficiently, using fewer computational resources and less memory. Moreover, LCMs are highly versatile and can be applied to various data modalities, including text, images, audio, and time series. They can also be combined in hierarchical or federated architectures to tackle complex problems and enable transfer learning across different domains. By operating at a higher level of abstraction and using more expressive representations, LCMs can learn more generalizable and interpretable features, making them suitable for a wide range of applications. This includes but is not limited to natural language processing, speech recognition, recommendation systems, and many others.

According to a preferred embodiment, a computer system comprising: a hardware memory, wherein the computer system is configured to execute software instructions stored on nontransitory machine-readable storage media that: tokenize a set of training data into a plurality of training tokens; create a codeword dictionary by assigning unique codewords to each of the plurality of training tokens; convert all training tokens into a plurality of training codewords using the codeword dictionary; train a large language model using the plurality of training codewords; receive a text prompt from a user; tokenize the prompt into a plurality of prompt tokens; convert the plurality of prompt tokens into a plurality of prompt codewords using the codeword dictionary; process the plurality of prompt codewords through a large language model to generate a plurality of thought codewords representing intermediate reasoning steps; associate each thought codeword with a corresponding portion of the prompt; encode the thought codewords with metadata; and store the thought codewords and their associated metadata, is disclosed.

According to another preferred embodiment, a computer-implemented method comprising the steps of: tokenizing a set of training data into a plurality of training tokens; creating a codeword dictionary by assigning unique codewords to each of the plurality of training tokens; converting all training tokens into a plurality of training codewords using the codeword dictionary; training a large language model using the plurality of training codewords; receiving a text prompt from a user; tokenizing the prompt into a plurality of tokens; converting the plurality of tokens into a plurality of prompt codewords using the codeword dictionary; processing the plurality of prompt codewords through a large language model to generate a plurality of thought codewords representing intermediate reasoning steps; associating each thought codeword with a corresponding portion of the prompt; encoding the thought codewords with metadata; and storing the thought codewords and their associated metadata, is disclosed.

According to an aspect of an embodiment, the text prompt is received, tokenized, and converted from tokens to codewords and from codewords back to tokens on an edge device.

According to an aspect of an embodiment, the codeword dictionary is a local codeword dictionary lookup on the edge device.

According to an aspect of an embodiment, the large language model uses a transformer based architecture.

According to an aspect of an embodiment, the large language model uses a Variational Autoencoder based architecture.

BRIEF DESCRIPTION OF THE DRAWING FIGURES

DETAILED DESCRIPTION OF THE INVENTION

Figure 1:
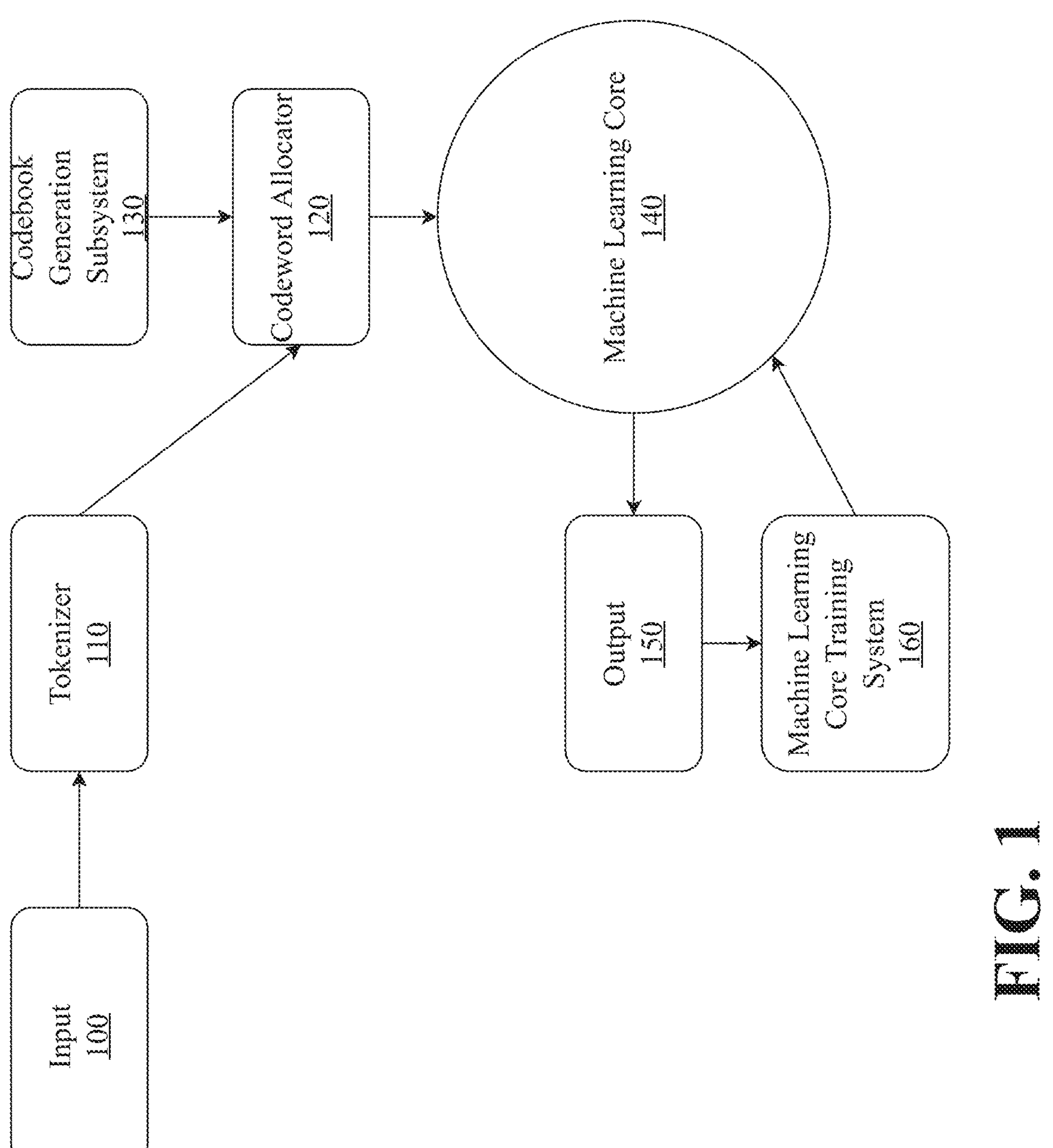
FIG. 1 is a block diagram illustrating an exemplary system architecture for a large codeword model for deep learning.

The inventor has conceived, and reduced to practice, a system and method for generating thoughts with large language models using codewords. Unlike traditional deep learning models that operate on raw tokens and dense embeddings, LCMs work with discrete, compressed representations called codewords. The LCM architecture consists of a tokenizer that splits the input data into meaningful semantic units called sourceblocks, a codebook generation subsystem that assigns unique codewords to each sourceblock, and a codeword allocator that maps the sourceblocks to their corresponding codewords. The codewords are then processed by a machine learning core, which can be implemented using various architectures such as Transformers, Variational Autoencoders (VAEs), or a combination of different models. The machine learning core learns to capture patterns, relationships, and semantics within the codeword sequences, enabling efficient and effective processing and generation of data.

The LCM's architecture is flexible and adaptable to different data modalities and tasks. It can be extended to handle multiple input types simultaneously by incorporating separate embedding layers for each modality and combining them into a unified representation for further processing. Additionally, LCMs can be used for cross-lingual translation by maintaining language-specific codebooks and machine learning cores, along with a codeword translator that maps codewords between different languages. The LCM architecture also supports codeword clustering, where semantically similar or co-occurring codewords are grouped together, and embeddings are learned for each cluster instead of individual codewords. This approach reduces the dimensionality of the embedding space and enables more efficient and meaningful representations. Overall, the LCM presents a powerful and versatile framework for deep learning that can be applied to a wide range of domains, offering benefits such as improved efficiency, scalability, and adaptability compared to traditional deep learning approaches.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "sourceblock" to a semantically meaningful unit of text that is derived from the input data through a process called syntactic splitting. Syntactic splitting involves breaking down the input text into smaller chunks along syntactic boundaries, such as those between words or tokens. These resulting chunks, or sourceblocks, serve as the basic units of representation in LCMs, replacing the traditional word or subword tokens used in Large Language Models (LLMs). Each sourceblock is then assigned a unique codeword from a codebook, which allows for efficient compression and processing of the text data. By preserving syntactic and semantic information within sourceblocks, LCMs aim to capture the inherent structure and meaning of the language more effectively while achieving higher compression ratios compared to LLMs.

As used herein, "machine learning core" refers to the central component responsible for processing and learning from the codeword representations derived from the input data. This core can consist of one or more machine learning architectures, working individually or in combination, to capture the patterns, relationships, and semantics within the codeword sequences. Some common architectures that can be employed in the machine learning core of LCMs include but are not limited to transformers, variational autoencoders (VAEs), recurrent neural networks (RNNs), convolutional neural networks (CNNs), and attention mechanisms. These architectures can be adapted to operate directly on the codeword representations, with or without the need for traditional dense embedding layers. The machine learning core learns to map input codeword sequences to output codeword sequences, enabling tasks such as language modeling, text generation, and classification. By leveraging the compressed and semantically rich codeword representations, the machine learning core of LCMs can potentially achieve more efficient and effective learning compared to traditional token-based models. The specific choice and configuration of the machine learning architectures in the core can be tailored to the characteristics of the input data and the desired output tasks, allowing for flexibility and adaptability in the design of LCMs.

As used herein, "thought" refers to a discrete unit of reasoning or analysis generated by a large language model during its processing of an input prompt. A thought represents the model's intermediate reasoning steps, analysis, or considerations about the prompt before generating a final response. Thoughts are generated during a reasoning phase of the model's operation and contain the model's understanding, context analysis, and logical processing of the prompt. Unlike raw text or embeddings, thoughts encapsulate the model's processed reasoning in a form that can be cached, retrieved, and reused for similar prompts. Thoughts may be explicitly visible in model outputs or may be internally generated, and can be stored in various cache architectures including local and cloud-based systems. These cached thoughts can be combined with new prompts to generate responses using smaller language models, effectively preserving the reasoning capabilities of larger models while reducing computational overhead.

As used herein, "context" refers to both traditional sequence-based context where a language model processes a series of tokens representing prior interactions or information, and thought-based context where the model processes higher-level abstractions in the form of thought sequences. Traditional context operates at the token level, maintaining a history of specific words, phrases, and their relationships through mechanisms like attention windows. In contrast, thought-based context operates at a higher level of abstraction, where each thought represents a complex unit of reasoning or understanding. This dual nature of context allows the system to maintain contextual awareness both through detailed token-level information and through more abstract thought-level representations, enabling efficient processing of complex interactions while reducing the computational overhead typically associated with maintaining long token sequences. Thought-based context can compress what would traditionally require thousands of tokens into a smaller number of thought units, each capturing key reasoning patterns and conceptual relationships relevant to the interaction.

Conceptual Architecture

Figure 17:
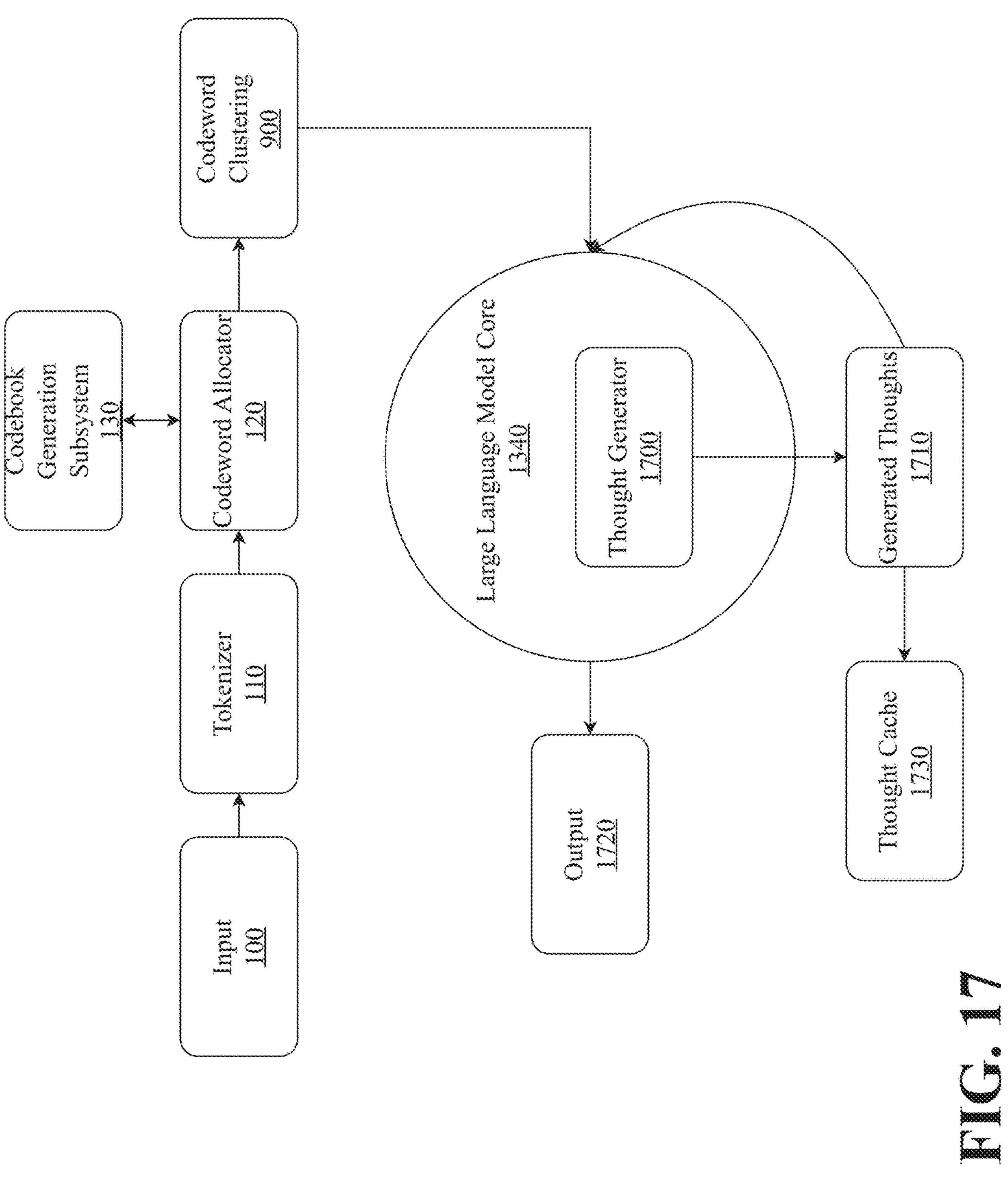
FIG. 17 is a block diagram illustrating an exemplary system architecture for a large codeword model that incorporates thought generation capabilities.

FIG. 17 is a block diagram illustrating an exemplary system architecture for a large codeword model that incorporates thought generation capabilities. The system receives an input 100 which represents the raw data that needs to be processed. This input data can be in various formats, such as text, images, audio, or other structured or unstructured data. The input is fed into a tokenizer 110 that is responsible for splitting the input data into meaningful semantic units called sourceblocks. The tokenizer employs techniques like subword tokenization methods to break down the input into manageable units that preserve semantic meaning.

A codebook generation subsystem 130 creates and maintains the codebook, which is a collection of all the unique codewords used by the system. This subsystem can employ techniques such as Huffman coding or other frequency-based algorithms to create an efficient mapping between sourceblocks and codewords. The codeword allocator 120 then assigns the appropriate codewords to each sourceblock based on the codebook, effectively converting the input data into a compact and efficient representation.

The assigned codewords may optionally pass through a codeword clustering module 900, which groups semantically similar or co-occurring codewords together. This clustering process aims to capture underlying semantic structures and relationships among the codewords, enabling more efficient processing and representation.

The clustered codewords are then fed into the large language model core 1340, which serves as the central processing unit for the system. The large language model core 1340 includes a thought generator 1700 that is responsible for extracting and formulating the model's internal reasoning processes. Unlike traditional language models that produce only final outputs, the thought generator 1700 captures the intermediate reasoning steps, analysis, and considerations that the model undergoes while processing the input.

The thought generator 1700 produces generated thoughts 1710, which are discrete units of reasoning or analysis represented as codewords. The generation process begins by accessing the internal hidden states, attention patterns, and activation values from the large language model core 1340 during its processing of the input prompt. These internal states are systematically analyzed using a multi-stage extraction process that identifies coherent reasoning patterns.

Thought generator 1700 may employ a sliding window approach across the model's hidden states to detect significant shifts in activation patterns that indicate transitions between distinct reasoning steps. For each identified reasoning segment, the generator applies a projection matrix that maps the high-dimensional hidden states into a more structured representation that captures the essential logical content while filtering out noise. These projected representations undergo further processing through a series of dense neural network layers that distill them into standardized thought formats.

Each generated thought encapsulates a specific aspect of the model's reasoning process, such as factual recall, logical inference, or evaluative judgment. The encapsulation process assigns a specific type classification to each thought based on its functional role in the reasoning chain. Factual thoughts contain retrieved information and are encoded using a specialized subset of the codeword vocabulary optimized for entity and relationship representation. Inferential thoughts, which represent logical connections, are encoded using a different subset of codewords that explicitly capture dependency relationships and causal structures. Evaluative thoughts, which represent judgments or assessments, are encoded with codewords that incorporate confidence scores and uncertainty markers.

The encoding process itself involves converting the structured representation into a sequence of intermediate semantic tokens, and then mapping tokens to the codeword vocabulary using the codebook generation subsystem 130. This approach ensures that the semantic content of the thought is preserved while benefiting from the efficiency of the codeword representation. The mapping employs a context-sensitive algorithm that considers both the individual semantic elements and their relationships within the thought structure, ensuring that the codeword sequence accurately captures the reasoning step's logic and content.

These thoughts are stored in a thought cache 1730, which maintains a repository of previously generated thoughts for potential future use. The cache implements a multi-tier storage architecture with different retention policies for different types of thoughts. Frequently accessed or highly valuable thoughts (as determined by usage statistics and quality metrics) are stored in a high-priority tier with rapid access times. Less frequently used thoughts are gradually migrated to lower-priority tiers with more efficient storage characteristics but slightly slower access times.

The thought cache 1730 organizes thoughts using multiple indexing structures to enable efficient retrieval based on various criteria. A semantic vector index allows for similarity-based retrieval, where thoughts can be found based on their conceptual similarity to a query. A prompt-association index enables retrieval based on relevance to specific prompt patterns or topics. A reasoning-chain index maintains the relationships between thoughts that form coherent reasoning sequences, allowing for retrieval of complete reasoning patterns rather than isolated thoughts.

In one embodiment, thought cache 1730 implements a dynamic eviction policy that balances storage efficiency with retrieval effectiveness. This policy considers factors such as but not limited to thought age, access frequency, contextual relevance to recent queries, and position within reasoning chains. Thoughts that are part of frequently used reasoning patterns are preserved even if they individually have low access rates, recognizing their importance in the broader context of reasoning reuse. Additionally, thought cache 1730 may employ incremental updating mechanisms that allow thoughts to be refined or corrected over time based on feedback or new information, without losing their associations with related thoughts or prompts.

Thought cache 1730 enables efficient storage and retrieval of reasoning patterns, allowing the system to reuse relevant thoughts without regenerating them each time. When a new prompt is received, the system computes its similarity to previously processed prompts using various metrics, including semantic vector similarity, structural pattern matching, and keyword overlap. Based on this similarity analysis, the system queries the thought cache to retrieve potentially relevant thoughts using a multi-stage retrieval process that progressively refines the results. This retrieval process can significantly reduce computational overhead by avoiding redundant reasoning operations for similar or related prompts.

Figure 18:
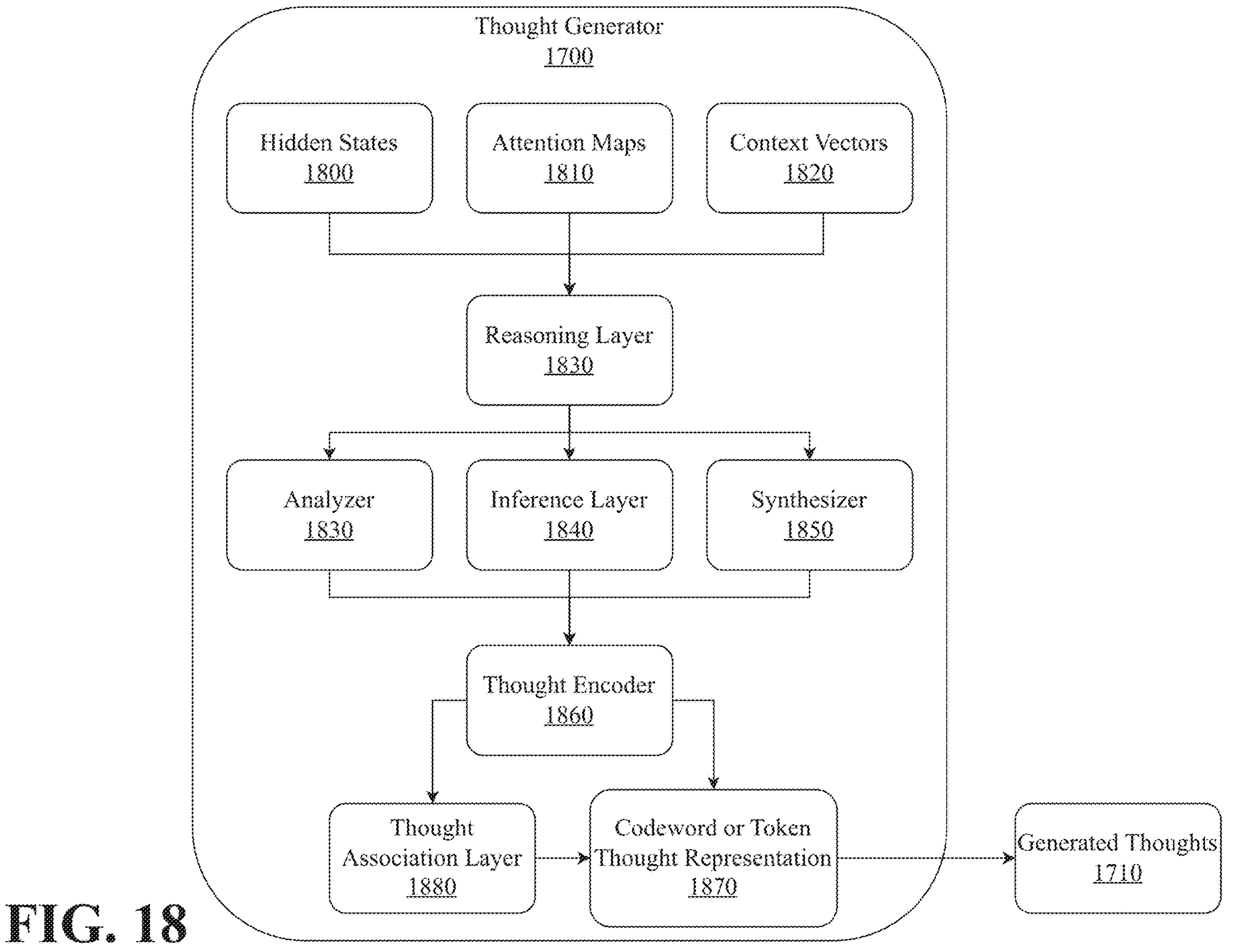
FIG. 18 is a block diagram illustrating the internal architecture of a thought generator within a large language model core.

FIG. 18 is a block diagram illustrating the internal architecture of a thought generator within a large language model core. The thought generator is responsible for extracting meaningful intermediate reasoning steps from the model's internal processing and converting them into discrete thought units represented as codewords.

The thought generator 1700 begins by accessing several internal representations from the language model, including hidden states 1800, attention maps 1810, and context vectors 1820. The hidden states 1800 capture the internal activations of the model's neural network layers, representing the model's evolving understanding of the input as it processes the sequence. Attention maps 1810 indicate which parts of the input the model is focusing on at different stages of processing, providing insights into the model's attentional patterns and focus. Context vectors 1820 aggregate information from different parts of the sequence, representing the contextual understanding that the model has built.

These internal representations are fed into a reasoning layer 1830, which serves as the central component for extracting coherent reasoning patterns from the model's internal states. The reasoning layer 1830 processes these inputs to identify distinct reasoning steps and analysis patterns that constitute the model's thinking process.

The output from the reasoning layer 1830 is then distributed to three specialized processing components: an analyzer 1830, an inference layer 1840, and a synthesizer 1850. The analyzer 1830 examines the input prompt and the model's initial understanding, identifying key concepts, constraints, and requirements. The inference layer 1840 performs logical reasoning and deduction based on the model's knowledge and the analyzed information. The synthesizer 1850 combines different pieces of analysis and inference to form coherent, integrated conclusions or responses.

The outputs from these three components are then passed to a thought encoder 1860, which formats the reasoning steps into structured thought representations. The thought encoder 1860 processes the raw reasoning outputs and transforms them into a standardized format suitable for representation as codewords or tokens.

The encoded thoughts are then processed through two parallel pathways. First, they are passed to a thought association layer 1880 that explicitly links each thought to relevant portions of the input prompt, establishing the relationship between thoughts and the context that triggered them. Second, they are converted into a codeword or token thought representation 1870, which represents each thought using the system's codeword vocabulary, allowing for compact storage and efficient processing.

The final output of the thought generator 1700 is a collection of generated thoughts 1710, each represented as a sequence of codewords or tokens that capture a discrete unit of reasoning or analysis. These thoughts are structured representations of the model's intermediate reasoning processes, explicitly capturing the step-by-step thinking that the model performs while processing the input.

Figure 22:
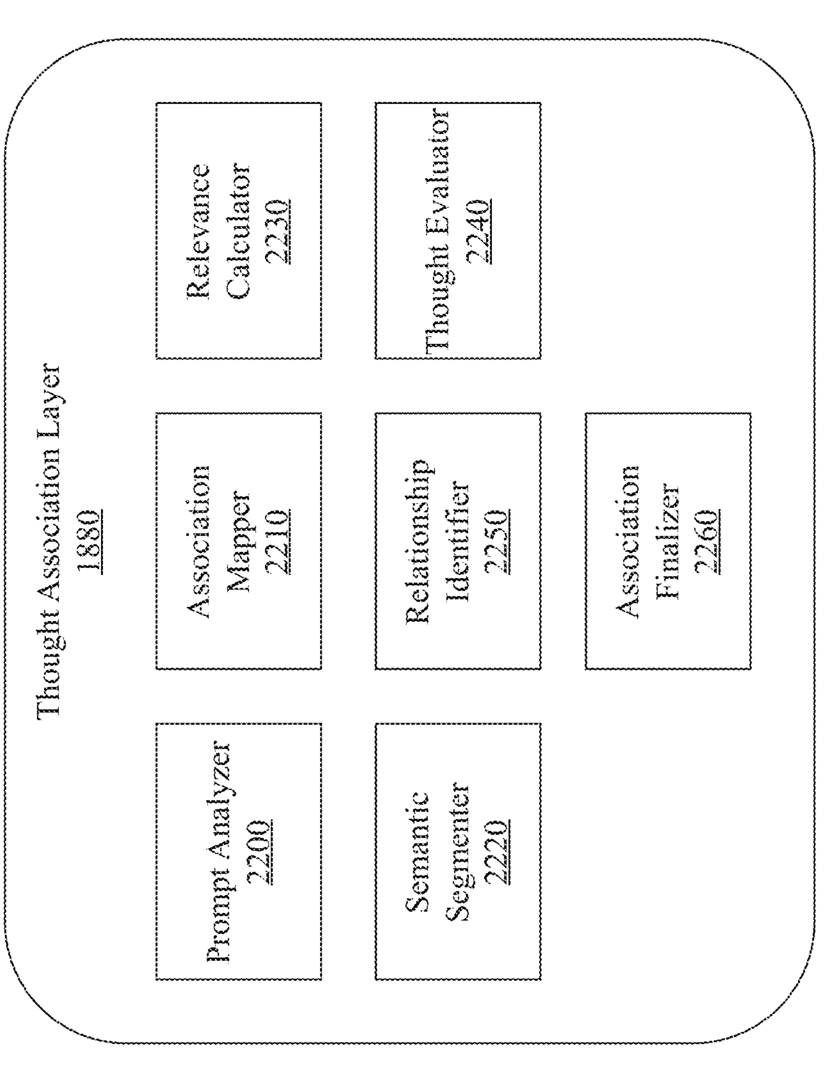
FIG. 22 is a block diagram illustrating an exemplary component of a system for a large codeword model that incorporates thought generation capabilities, a thought association layer.

FIG. 22 is a block diagram illustrating an exemplary component of a system for a large codeword model that incorporates thought generation capabilities, a thought association layer. A thought association layer 1880 comprises several specialized subcomponents that work together to analyze, evaluate, and establish connections between thoughts and prompt segments. A prompt analyzer 2200 is responsible for examining the input prompt to identify its key components, requirements, and conceptual structure. This analysis forms the foundation for subsequent association operations by providing a clear understanding of what the prompt is asking or stating. Prompt analyzer 2200 may employ natural language processing techniques to discern the explicit and implicit elements of the prompt, including questions, constraints, contexts, and assumptions.

Working in close coordination with prompt analyzer 2200, a semantic segmenter 2220 breaks down the prompt into distinct semantic units or conceptual portions. These segments represent coherent conceptual chunks within the prompt that can be individually associated with relevant thoughts. Semantic segmenter 2220 identifies natural boundaries in the prompt's structure, such as separate questions, distinct requirements, or different conceptual domains addressed within a single prompt.

A thought evaluator 2240 examines each generated thought to assess its content, purpose, and relevance to different aspects of the prompt. This evaluation considers the semantic content of the thought, its reasoning type, and its functional role in the overall response generation process. Thought evaluator 2240 may analyze patterns in the thought's codeword representation, its position in the reasoning sequence, and its relationship to other thoughts to determine its significance and applicability to different prompt segments.

An association mapper 2210 creates explicit links between thoughts and their corresponding prompt segments based on the outputs of prompt analyzer 2200, semantic segmenter 2220, and thought evaluator 2240. These associations form a structured mapping that clearly identifies which thoughts address which aspects of the prompt. Association mapper 2210 may implement various mapping strategies, such as one-to-one mappings for thoughts that specifically address a single prompt segment, one-to-many mappings for thoughts that span multiple segments, or many-to-one mappings where multiple thoughts collectively address a single segment.

A relevance calculator 2230 quantifies the strength and specificity of each thought-to-prompt association. It assigns numerical scores that indicate how directly and comprehensively a thought addresses its associated prompt segments. These relevance scores enable prioritization and filtering of thoughts based on their significance to different aspects of the prompt. Relevance calculator 2230 may employ semantic similarity metrics, attention pattern analysis, or learned relevance models to generate accurate and meaningful scores.

A relationship identifier 2250 detects and represents the connections between different thoughts in the reasoning sequence. It identifies logical and functional relationships such as prerequisite dependencies, supporting evidence, elaboration, or contradiction between thoughts. These thought-to-thought relationships complement the thought-to-prompt associations, providing a more comprehensive understanding of the reasoning structure. Relationship identifier 2250 may examine the sequential order of thoughts, their semantic overlap, and their logical consistency to infer meaningful relationships.

An association finalizer 2260 integrates the outputs from all other subcomponents to create a comprehensive mapping structure that represents both thought-to-prompt associations and thought-to-thought relationships. This integrated mapping provides a complete context for each thought, including what prompted it, what role it plays in the reasoning process, and how it relates to other thoughts. Association finalizer 2260 ensures that the association structure is consistent, complete, and optimized for efficient retrieval and utilization.

Together, these subcomponents of the thought association layer 1880 enable the system to maintain a clear understanding of how each thought relates to the user's input and to other thoughts in the reasoning process. This structured association information enhances the system's ability to generate coherent and contextually appropriate responses while also enabling more effective thought caching and retrieval for future use.

FIG. 1 is a block diagram illustrating an exemplary system architecture for a large codeword model for deep learning. An input 100 represents the raw data that needs to be processed by the LCM. This data can be in various modalities, such as text, images, audio, time series, or any other structured or unstructured format. The input data is fed into the tokenizer 110 for further processing.

A tokenizer 110 is responsible for splitting the input data into meaningful semantic units called sourceblocks. This process, known as semantic splitting, aims to capture the inherent structure and patterns in the data. The tokenizer can employ various techniques to identify the optimal sourceblocks, such as rule-based splitting, statistical methods, or machine learning approaches. For textual data, the tokenizer may use subword tokenization methods like Byte-Pair Encoding (BPE) or WordPiece, which break down words into smaller, more frequently occurring units. For images, the tokenizer may use approaches such as but not limited to a patch-approach, where the image is divided into fixed-size patches or regions. The specific tokenization method can be chosen based on the data modality and the characteristics of the domain. For example, the first paragraph of Leo Tolstoy's War and Peace which reads, "Well, Prince, so Genoa and Lucca are now just family estates of the Buonapartes," may be tokenized into ['Well', ',', 'Prince', ',', 'so', 'Gen', 'oa', 'and', 'Luc', 'ca', 'are', 'now', 'just', 'family', 'estates', 'of', 'the', 'Buon', 'apar', 'tes', '.'].

In one embodiment, the tokenizer may utilize Huffman coding to split the data into sourceblocks. The Huffman coding-based tokenizer enables efficient and semantically meaningful splitting of the input data into sourceblocks. Huffman coding is a well-known data compression algorithm that assigns variable-length codes to symbols based on their frequency of occurrence. In the context of the LCM, the Huffman coding-based tokenizer adapts this principle to perform semantic splitting of the input data.

With Huffman coding, the tokenizer starts by analyzing the input data and identifying the basic units of meaning, such as words, phrases, or subwords, depending on the specific data modality and the desired level of granularity. These basic units form the initial set of sourceblocks. The tokenizer then performs a frequency analysis of the sourceblocks, counting the occurrences of each sourceblock in the input data. Based on the frequency analysis, the tokenizer constructs a Huffman tree, which is a binary tree that represents the probability distribution of the sourceblocks. The Huffman tree is built by iteratively combining the two least frequent sourceblocks into a single node, assigning binary codes to the branches, and repeating the process until all sourceblocks are included in the tree. The resulting Huffman tree has the property that sourceblocks with higher frequencies are assigned shorter codes, while sourceblocks with lower frequencies are assigned longer codes.

The Huffman coding-based tokenizer then uses the constructed Huffman tree to perform semantic splitting of the input data. It traverses the input data and matches the sequences of symbols against the sourceblocks represented in the Huffman tree. When a sourceblock is identified, the tokenizer assigns the corresponding Huffman code to that sourceblock, effectively compressing the data while preserving its semantic structure. The use of Huffman coding for semantic splitting offers several advantages. It allows for variable-length sourceblocks, enabling the tokenizer to capture meaningful units of varying sizes. This is particularly useful for handling data with different levels of complexity and granularity, such as text with compound words or images with hierarchical structures.

A Huffman coding-based approach optimizes the representation of the sourceblocks based on their frequency of occurrence. By assigning shorter codes to more frequent sourceblocks and longer codes to less frequent ones, the tokenizer achieves data compression while still preserving the semantic information. This compression reduces the overall size of the data and improves the efficiency of subsequent processing stages. Additionally, the Huffman tree construction process inherently captures the statistical properties and patterns within the input data. The resulting sourceblocks and their assigned codes reflect the underlying structure and relationships present in the data. This semantic awareness enhances the ability of the LCM to learn and generate meaningful representations.

After the semantic splitting process, the resulting sourceblocks and their assigned Huffman codes are passed to the codeword allocator. The codeword allocator maps each sourceblock to a unique codeword, which is a compact representation used by the subsequent components of the LCM architecture. The codeword mapping can be based on various schemes, such as a fixed-length binary encoding or a learned embedding space.

Once the input data is tokenized into sourceblocks, the codeword allocator 120 assigns a unique codeword to each sourceblock. The codewords are discrete, compressed representations of the sourceblocks, designed to capture the essential information in a compact form. The codeword allocator can use various mapping schemes to assign codewords to sourceblocks, such as hash functions, lookup tables, or learned mappings. For example, a simple approach could be to use a hash function that maps each sourceblock to a fixed-length binary code. Alternatively, another approach may involve learning a mapping function that assigns codewords based on the semantic similarity of the sourceblocks.

The codebook generation subsystem 130 is responsible for creating and maintaining the codebook, which is a collection of all the unique codewords used by the LCM. The codebook can be generated offline, before the actual processing begins, or it can be updated dynamically as new sourceblocks are encountered during processing. The codebook generation subsystem can use various techniques to create a compact and efficient codebook, such as frequency-based pruning, clustering, or vector quantization. The size of the codebook can be adjusted based on the desired trade-off between compression and information preservation. Going back to the War and Peace example, the string of tokens ['Well', ',', 'Prince', ',', 'so', 'Gen', 'oa', 'and', 'Luc', 'ca', 'are', 'now', 'just', 'family', 'estates', 'of', 'the', 'Buon', 'apar', 'tes', '.'] may be given codewords such as [12, 5, 78, 5, 21, 143, 92, 8, 201, 45, 17, 33, 49, 62, 87, 11, 2, 179, 301, 56, 4], where each token is assigned a unique codeword, which is represented as an integer. The mapping between tokens and codewords is determined by the codebook generated by the LCM system.

The machine learning core 140 is the central component of the LCM architecture, where the actual learning and processing take place. The core operates on the codewords generated by the codeword allocator, learning to process, generate, and manipulate the compressed representations. The machine learning core can be implemented using various configurations, depending on the specific task and data modality. Some possible variations include:

In one embodiment, the machine learning core 140 may be a Transformer-based core. The Transformer-based core consists of several key components. An embedding layer maps the codewords to dense vector representations, capturing their semantic and syntactic properties. Positional encoding is used to incorporate positional information into the codeword embeddings, enabling the Transformer to distinguish the relative positions of the codewords in the input sequence. The multi-head attention mechanism, which is the core building block of the Transformer, allows the model to attend to different parts of the input sequence simultaneously, capturing complex dependencies and relationships between codewords. Feed-forward networks are used to introduce non-linearity and increase the expressive power of the model. Residual connections and layer normalization are employed to facilitate the flow of information and stabilize the training process.

The Transformer-based core can be implemented using an encoder-decoder architecture. The encoder processes the input codewords and generates contextualized representations, while the decoder takes the encoder's output and generates the target codewords or the desired output sequence. The encoder and decoder are composed of multiple layers of multi-head attention and feed-forward networks, allowing for deep and expressive processing of the codeword representations.

One of the key advantages of the Transformer-based core in the LCM architecture is its ability to capture long-range dependencies between codewords. Unlike recurrent neural networks (RNNs), which process the input sequentially, the Transformer can attend to all codewords in parallel, enabling it to effectively capture relationships and dependencies that span across the entire input sequence. This is useful for processing long and complex data sequences, where capturing long-range dependencies is crucial for understanding the overall context. Another advantage of the Transformer-based core is its parallelization capability. The self-attention mechanism in the Transformer allows for efficient parallel processing of the codewords on hardware accelerators like GPUs. This parallelization enables faster training and inference times, making the LCM architecture suitable for processing large amounts of data in real-time applications.

The Transformer-based core also generates contextualized representations of the codewords, where each codeword's representation is influenced by the surrounding codewords in the input sequence. This contextualization allows the model to capture the semantic and syntactic roles of the codewords based on their context, enabling a deeper understanding of the relationships and meanings within the data. The scalability of the Transformer-based core is another significant advantage in the LCM architecture. By increasing the number of layers, attention heads, and hidden dimensions, the Transformer can learn more complex patterns and representations from large-scale datasets. This scalability has been demonstrated by models like GPT-3, which has billions of parameters and can perform a wide range of tasks with impressive performance.

In another embodiment, the machine learning core 140 may utilize a Variational Autoencoder (VAE)-based core. A VAE-based core consists of two main components: an encoder and a decoder. The encoder takes the codewords as input and maps them to a lower-dimensional latent space representation. The encoder is typically implemented as a neural network, such as a multi-layer perceptron (MLP) or a convolutional neural network (CNN), depending on the nature of the codewords and the data modality. The encoder learns to compress the codewords into a compact latent representation while capturing the essential features and relationships within the data.

The decoder, on the other hand, takes the latent space representation and reconstructs the original codewords. The decoder is also implemented as a neural network, typically the inverse architecture of the encoder. The decoder learns to map the latent space representation back to the codeword space, generating codewords that closely resemble the original input. One of the key advantages of the VAE-based core in the LCM architecture is its ability to learn a continuous and structured latent space representation of the codewords. The latent space captures the underlying patterns and relationships within the data, allowing for smooth interpolation and generation of new codewords. By sampling from the latent space, the VAE-based core can generate novel and meaningful codewords that are similar to the original data distribution.

The VAE-based core also enables efficient compression of the codewords. By encoding the codewords into a lower-dimensional latent space, the VAE reduces the storage and computational requirements of the LCM. The compact latent representation can be used for various downstream tasks, such as data compression, similarity search, or data generation. The VAE-based core in the LCM architecture offers several advantages over traditional data processing techniques. It enables the learning of a compact and expressive latent representation of the codewords, capturing the essential features and relationships within the data. The continuous latent space allows for smooth interpolation and generation of new codewords, enabling tasks such as data augmentation, anomaly detection, and creative content generation.

The LCM architecture with the VAE-based core has a wide range of applications across various domains. In natural language processing, it can be used for tasks such as language modeling, text generation, and text compression. In computer vision, the VAE-based core can be applied to image compression, image generation, and unsupervised representation learning. The architecture can also be used for audio and speech processing, where the codewords represent audio features, enabling tasks such as audio compression, speech synthesis, and music generation.

In another embodiment, the machine learning core 140 may be a Recurrent Neural Network (RNN)-based core. The RNN-based core consists of one or more recurrent layers, such as Long Short-Term Memory (LSTM) or Gated Recurrent Unit (GRU) layers. These recurrent layers maintain an internal state that allows them to remember and process information from previous time steps, enabling the capture of long-term dependencies and context within the codeword sequences.

The RNN-based core takes a sequence of codewords as input and processes them one at a time. At each time step, the RNN-based core updates its internal state based on the current input codeword and the previous state. This allows the core to learn and encode the temporal dependencies and patterns within the codeword sequences.

The RNN-based core can be used for various tasks, such as codeword sequence prediction, codeword generation, and sequence-to-sequence mapping. In codeword sequence prediction, the RNN-based core learns to predict the next codeword in a sequence given the previous codewords. This enables tasks such as language modeling, time series forecasting, and predictive maintenance.

In codeword generation, the RNN-based core can be trained to generate new codeword sequences based on a learned probability distribution. By sampling from this distribution, the core can generate novel and coherent codeword sequences that resemble the training data. This has applications in tasks such as text generation, music composition, and synthetic data generation. Sequence-to-sequence mapping involves using two RNN-based cores, an encoder and a decoder, to map an input codeword sequence to an output codeword sequence. The encoder RNN processes the input sequence and generates a fixed-length context vector that captures the essential information. The decoder RNN takes the context vector and generates the output codeword sequence step by step. This architecture has been successfully applied to tasks such as machine translation, speech recognition, and image captioning.

The RNN-based core in the LCM architecture offers several advantages over traditional data processing techniques. It enables the capture and modeling of temporal dependencies and sequential patterns within the codeword sequences, which is crucial for processing and generating sequential data. The RNN-based core can learn and adapt to the specific characteristics and patterns of the data, allowing for more accurate and contextually relevant processing and generation. Furthermore, the RNN-based core can handle variable-length sequences, making it suitable for processing data with different lengths and temporal resolutions. The recurrent nature of the RNN allows it to maintain and propagate information over long sequences, enabling the capture of long-term dependencies and context.

In another embodiment, the core can be implemented as a hybrid of multiple architectures, combining the strengths of different approaches. For example, a Transformer-VAE hybrid can be used, where the Transformer encoder generates contextualized representations of the codewords, and the VAE decoder generates new codewords based on the learned latent space. The specific choice of the machine learning core can be tailored to the requirements of the task and the characteristics of the data. The modular nature of the LCM architecture allows for easy experimentation and adaptation of different core configurations.

After processing the codewords, the machine learning core generates the output 150 in the desired format. The output can be in the form of codewords, which can be mapped back to the corresponding sourceblocks or tokens using the inverse mapping scheme. Alternatively, the output can be directly generated in the target modality, such as text, images, or audio, depending on the specific application.

The LCM architecture offers several advantages over traditional deep learning approaches. By operating on compressed codewords instead of raw tokens, the LCM can reduce the computational and memory requirements, making it more efficient and scalable. The semantic splitting and codeword representation also allow the LCM to capture the inherent structure and patterns in the data, enabling more effective learning and generalization. Moreover, the modular nature of the LCM architecture allows for easy adaptation to different data modalities and tasks, making it a versatile and flexible framework for various applications. Sample PyTorch pseudocode for building an LCM with generated codebooks may be found in APPENDIX: A.

Figure 2:
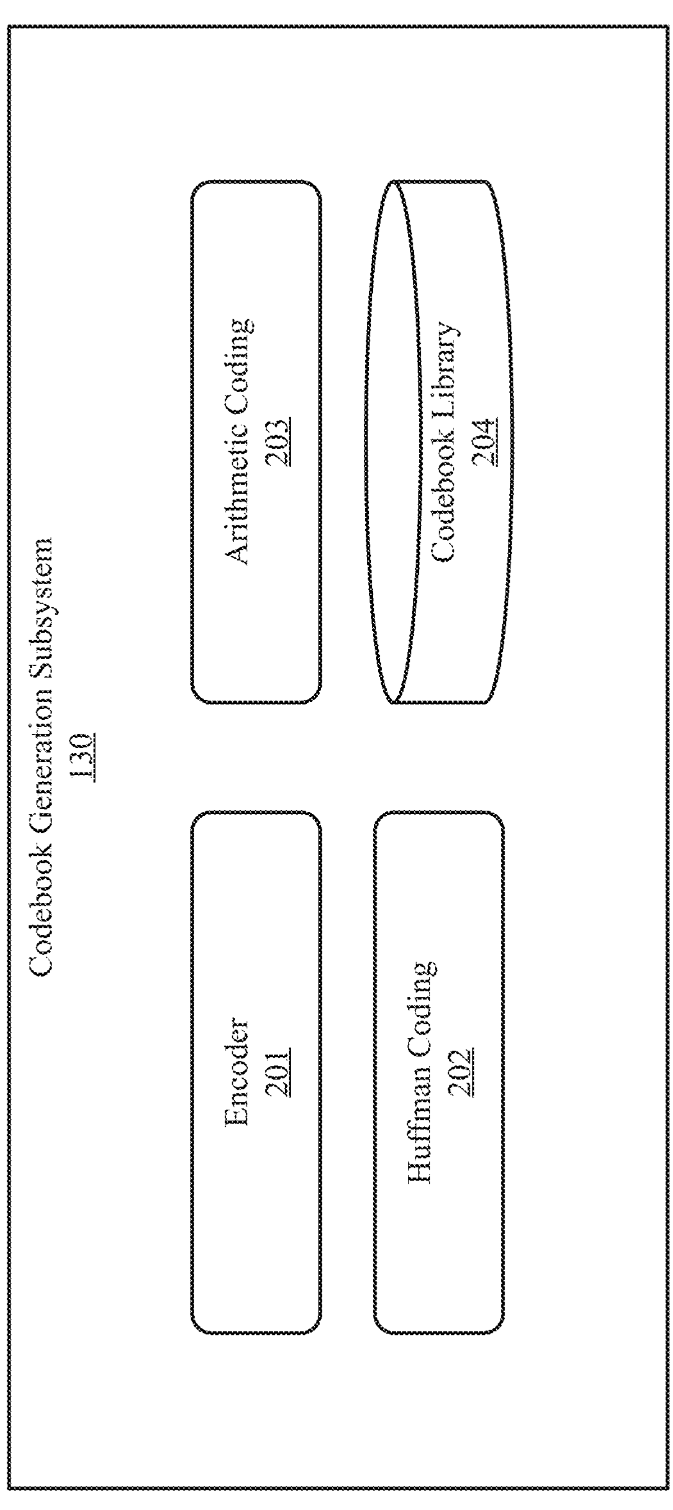
FIG. 2 is a block diagram illustrating an aspect of system for a large codeword model for deep learning, a codeword generation subsystem.

FIG. 2 is a block diagram illustrating an aspect of system and method for a large codeword model for deep learning, a codeword generation subsystem. According to the aspect, codebook generation subsystem 130 is configured to generate one or more codebooks for a collection of input data using various techniques, such as Huffman coding or arithmetic coding.

The codebook is an important component of the codebook-based homomorphic compression system. According to the embodiment, it is a collection of codewords, where each codeword corresponds to a sourceblock in the tokenized input. The codebook may generated based on the frequency distribution of the tokenized inputs, assigning shorter codewords to more frequently occurring tokens and longer codewords to less frequent tokens. There are several techniques for generating the codebook, with the goal of minimizing the average codeword length while maintaining the uniqueness of the codewords. Two common techniques are Huffman coding 202 and arithmetic coding 203. Huffman coding 202 is a variable-length coding technique that assigns codewords based on the frequency of occurrence of each symbol (sourceblock). It constructs a binary tree, known as the Huffman tree, where each leaf node represents a symbol and the path from the root to the leaf determines the codeword. More frequent symbols are assigned shorter codewords, while less frequent symbols receive longer codewords. Huffman coding guarantees an optimal prefix code, meaning no codeword is a prefix of any other codeword. For example, consider the quantized temperature data from the previous example. Let's say the frequency distribution of the intervals is as follows:

Sourceblock 0: 5%
Sourceblock 1: 10%
Sourceblock 2: 20%
Sourceblock 3: 15%
Sourceblock 4: 50%

Using Huffman coding, the codebook generation subsystem 130 can generate the following codebook:

Sourceblock 0: 1100
Sourceblock 1: 101
Sourceblock 2: 00
Sourceblock 3: 01
Sourceblock 4: 11

The most frequent tokenized input (Sourceblock 4) receives the shortest codeword (11), while the least frequent tokenized input (Sourceblock 0) receives the longest codeword (1100).

Arithmetic coding 203 is another entropy coding technique that assigns codewords to sourceblocks based on their probability distribution. Unlike Huffman coding, arithmetic coding does not assign fixed codewords to symbols. Instead, it represents the entire message as a single fractional number between 0 and 1. The interval [0, 1) is recursively divided based on the probabilities of the symbols, and the final codeword is a binary fraction that falls within the subinterval corresponding to the entire message. Arithmetic coding achieves near-optimal compression rates but requires more computational complexity compared to Huffman coding. For example, using the same quantized temperature data and frequency distribution as before, arithmetic coding would assign subintervals to each symbol based on their probabilities:

Sourceblock 0: [0.00, 0.05)
Sourceblock 1: [0.05, 0.15)
Sourceblock 2: [0.15, 0.35)
Sourceblock 3: [0.35, 0.50)
Sourceblock 4: [0.50, 1.00)

To encode a message sequence like [Sourceblock 4, Sourceblock 2, Sourceblock 1], arithmetic coding would recursively subdivide the interval [0, 1) based on the probabilities of the symbols, resulting in a final subinterval. The codeword would be a binary fraction that lies within this final subinterval.

According to an embodiment, an encoder component 201 is present and configured to implement one or more deep learning techniques for generating codewords for quantized data. Deep learning techniques can be employed to generate effective codewords for the quantized data. One approach is to use deep learning-based autoencoder models to learn compact and meaningful representations of the quantized data. Autoencoders are neural network architectures that consist of an encoder and a decoder, where the encoder learns to compress the input data into a lower-dimensional latent space, and the decoder reconstructs the original data from the latent representation.

Here are a few exemplary deep learning encoding techniques that can be implemented for creating codewords of the quantized data, according to an embodiment. Convolutional autoencoders (CAEs) leverage convolutional neural networks (CNNs) in the encoder and decoder parts of the autoencoder. CNNs are particularly effective in capturing spatial dependencies and hierarchical features in data, making them well-suited for encoding structured data such as images or time series. In the context of the codebook-based homomorphic compression, a CAE can be trained on the quantized data. The encoder part of the CAE learns to compress the quantized data into a compact latent representation, which serves as the codeword. The decoder part learns to reconstruct the quantized data from the codeword. As an example, consider an example of using a CAE for encoding quantized sensor data. The quantized data is represented as a 2D matrix, where each row corresponds to a sensor reading, and each column represents a time step. The CAE encoder consists of convolutional layers followed by pooling layers, which gradually reduce the spatial dimensions of the input and extract meaningful features. The output of the encoder is a compact latent representation, which serves as the codeword. The CAE decoder consists of upsampling layers and convolutional layers, which reconstruct the original quantized data from the codeword.

Another form of deep learning coding includes recurrent autoencoders (RAEs). Recurrent autoencoders utilize recurrent neural networks (RNNs) in the encoder and decoder parts of the autoencoder. RNNs are well-suited for processing sequential data, such as time series or natural language, as they can capture temporal dependencies and context. An RAE can be used to encode quantized sequential data. The encoder part of the RAE consists of recurrent layers, such as Long Short-Term Memory (LSTM) or Gated Recurrent Unit (GRU) layers, which process the input sequence and generate a fixed-length latent representation, serving as the codeword. The decoder part of the RAE takes the codeword and reconstructs the original quantized sequence. For example, consider an example of using an RAE for encoding quantized audio data. The quantized audio signal is represented as a sequence of amplitude values. The RAE encoder consists of LSTM layers that process the input sequence and generate a fixed-length latent representation, which serves as the codeword. The RAE decoder, also consisting of LSTM layers, takes the codeword and reconstructs the original quantized audio sequence.

Another form of deep learning coding includes variational autoencoders (VAEs). Variational autoencoders extend the concept of autoencoders by introducing a probabilistic framework. VAEs learn to encode the input data into a probability distribution in the latent space, rather than a single point. The encoder part of the VAE learns to map the input data to the parameters of a probability distribution (e.g., mean and variance of a Gaussian distribution), and the decoder part learns to reconstruct the original data from samples drawn from this distribution. A VAE can be used to generate codewords that capture the underlying probability distribution of the quantized data. The encoder part of the VAE learns to map the quantized data to the parameters of a probability distribution in the latent space. The codewords are then obtained by sampling from this distribution. The decoder part of the VAE learns to reconstruct the original quantized data from the sampled codewords. Consider an example of using a VAE for encoding quantized image data. The quantized images are fed into the VAE encoder, which learns to map each image to the parameters of a Gaussian distribution in the latent space. The codewords are obtained by sampling from this distribution. The VAE decoder takes the sampled codewords and reconstructs the original quantized images.

Another form of deep learning coding includes deep belief networks (DBNs). Deep Belief Networks are generative models that consist of multiple layers of restricted Boltzmann machines (RBMs). DBNs can learn hierarchical representations of the input data by training each layer in an unsupervised manner, followed by fine-tuning the entire network using supervised learning. DBNs can be used to generate codewords that capture the hierarchical structure of the quantized data. The DBN is trained on the quantized data, and the activations of the hidden layers serve as the codewords. The hierarchical nature of DBNs allows for capturing complex patterns and dependencies in the data. Consider an example of using a DBN for encoding quantized text data. The quantized text is represented as a binary vector, where each element corresponds to the presence or absence of a specific word. The DBN is trained on the quantized text data, and the activations of the hidden layers serve as the codewords. The DBN learns to capture the hierarchical structure and semantic relationships in the text data.

These are just a few examples of deep learning encoding techniques that can be explored for creating codewords of the quantized data in a LCM. The choice of the specific deep learning architecture depends on the nature of the data and the desired properties of the codewords. It's important to note that the deep learning encoding process should be designed to generate codewords that are suitable for homomorphic operations. The codewords should exhibit certain properties, such as being compatible with the homomorphic encryption scheme's plaintext space and allowing for efficient homomorphic computations.

During the training process of the deep learning models, the objective function should be designed to capture the desired properties of the codewords, such as minimizing the reconstruction error while ensuring the codewords are suitable for homomorphic operations. Additionally, regularization techniques can be employed to encourage sparsity or other desirable properties in the codewords. Once the deep learning models are trained, the encoder part can be used to generate codewords for new quantized data. The generated codewords can then be used in the codebook-based homomorphic compression scheme, enabling efficient and privacy-preserving computations on the compressed data.

Experimental evaluation and performance analysis can be conducted to assess the effectiveness of the deep learning encoding techniques in generating codewords that achieve good compression ratios, maintain low approximation errors, and enable efficient homomorphic operations. The choice of the deep learning architecture and hyperparameters can be fine-tuned based on the specific requirements and characteristics of the data.

According to the aspect, a codebook library 204 is present and configured to store a plurality of codewords (i.e., a codebook) generated by one or more of the techniques described herein. When it comes to storing the codewords and codebook in the codebook-based homomorphic compression system, several database systems and data storage solutions can be considered. The choice of the storage system depends on factors such as the size of the codebook, the frequency of updates, the retrieval and query requirements, and the overall system architecture. In some implementations key-value stores may be used, Key-value stores are a type of NoSQL database that provide a simple and efficient way to store and retrieve data based on a unique key. Examples of key-value stores include Redis, Memcached, and Amazon DynamoDB. For storing the codewords and codebook, key-value stores can be used to store each codeword as a key-value pair, where the key represents the codeword, and the value represents the corresponding data or metadata associated with the codeword. The codebook can be stored as a collection of key-value pairs, allowing for fast retrieval of codewords based on their keys. Key-value stores offer high performance, low latency, and scalability, making them suitable for scenarios where fast retrieval of codewords is critical.

Document databases, such as MongoDB or Couchbase, store data as flexible, semi-structured documents in formats like JSON or BSON. They provide a schema-less design and allow for easy modification of the data structure. For storing the codewords and codebook, document databases can be used to store each codeword as a document, along with its associated data or metadata. The codebook can be stored as a collection of documents, where each document represents a codeword and its related information. Document databases offer flexibility in terms of data structure, allowing for easy addition or modification of codeword attributes. They also provide querying capabilities based on document fields, enabling efficient retrieval of codewords based on specific criteria.

Relational databases, such as MySQL, PostgreSQL, or Oracle, can also be used to store the codewords and codebook. In a relational database, the codewords can be stored in a table with columns representing the codeword and its associated data or metadata. The codebook can be stored in a separate table, with each row representing a codeword and its corresponding information. Relational databases provide structured querying capabilities using SQL, allowing for efficient retrieval and filtering of codewords based on specific conditions. Relational databases offer strong consistency, ACID properties, and support for complex queries, making them suitable for scenarios where data integrity and structured querying are important.

Graph databases, such as Neo4j or Amazon Neptune, store data as nodes and edges in a graph structure. They are designed to efficiently handle complex relationships and connections between data entities. For storing the codewords and codebook, graph databases can be used to represent the relationships between codewords and their associated data or metadata. Each codeword can be represented as a node in the graph, with edges connecting related codewords or linking codewords to their corresponding data. Graph databases provide efficient traversal and querying capabilities based on the graph structure, allowing for fast retrieval of connected codewords and exploration of relationships between codewords.

Distributed key-value stores, such as Apache Cassandra or Apache HBase, are designed to handle large-scale data and provide high scalability and fault tolerance. They distribute data across multiple nodes in a cluster, allowing for horizontal scaling. For storing the codewords and codebook, distributed key-value stores can be used to store codewords as key-value pairs, similar to regular key-value stores. The codebook can be partitioned and distributed across multiple nodes in the cluster, enabling high scalability and performance. Distributed key-value stores offer eventual consistency, high write throughput, and the ability to handle large volumes of data, making them suitable for scenarios where scalability and fault tolerance are critical.

Figure 3:
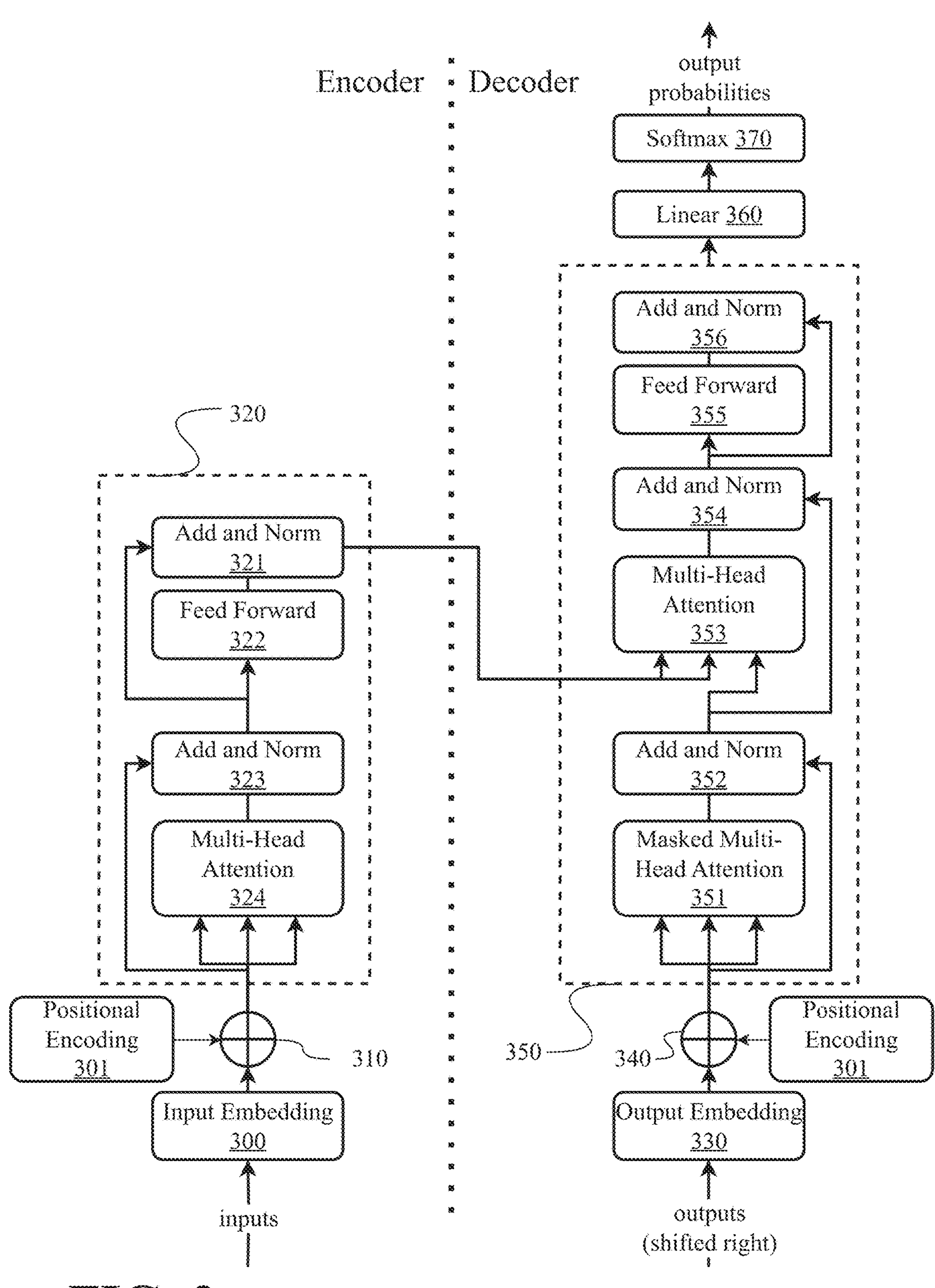
FIG. 3 is a block diagram illustrating an embodiment of the system for a large codeword model for deep learning, where the machine learning core is a Transformer-based core.

FIG. 3 is a block diagram illustrating an embodiment of the system and method for a large codeword model for deep learning, where the machine learning core is a Transformer-based core. A Transformer generally comprises an Encoder (the components on the left side of the illustration) and a Decoder (the components on the right side of the illustration).

The illustrated Transformer comprises an Encoder and a Decoder. The Encoder takes input embeddings and processes them through a stack of layers (represented as dashed box 320). Each layer consists of: positional encoding, which adds position information to the input embeddings; multi-head attention, which allows the model to attend to different parts of the input sequence; add and norm, which applies residual connection and layer normalization; feed forward, which is a fully connected feed-forward network; and add and norm which is another residual connection and layer normalization.

The power of the transformer model lies in the self-attention mechanism. This mechanism contributes to accelerated learning compared to traditional models such as long short-term memory models. Self-attention empowers the transformer model with the remarkable capability to meticulously scrutinize distinct segments of a given sequence or even encompass the entire contextual essence of a sentence. This profound contextual awareness enables the model to make predictions with an elevated degree of accuracy and relevance.

The input embedding 300 to the Encoder is a sequence of tokens, typically represented as integers. Each token is mapped to a learnable embedding vector of a fixed size. The embedding layer is a lookup table that converts each token into its corresponding dense vector representation. The embeddings are learned during training and capture semantic and syntactic relationships between tokens.

A dense vector representation, also known as a dense embedding or a continuous vector representation, is a way of representing data, particularly words or tokens, as dense vectors in a high-dimensional continuous space. In the context of natural language processing (NLP) and language models, dense vector representations are used to capture semantic and syntactic information about words or tokens. Each word or token is mapped to a fixed-size vector of real numbers, typically with hundreds or thousands of dimensions. Each word or token is represented by a vector of a fixed size, regardless of the length of the input sequence. The size of the vector is a hyperparameter that is determined during model design. The vectors exist in a continuous high-dimensional space, where each dimension represents a latent feature or aspect of the word or token. The continuous nature allows for capturing fine-grained relationships and similarities between words. The dense vector representations are learned during the training process of the model. The model learns to assign similar vectors to words that have similar meanings or occur in similar contexts. The dense vector representations aim to capture semantic and syntactic relationships between words. Words that have similar meanings or are used in similar contexts tend to have similar vector representations. Dense vector representations allow for performing algebraic operations on words, such as addition and subtraction. These operations can capture analogies and relationships between words, such as "prince"−"man"+"woman"≈"princess". Dense vector representations serve as input features for various downstream NLP tasks, such as text classification, sentiment analysis, named entity recognition, and machine translation. The dense representations provide a rich and informative input to the models, enabling them to learn patterns and make predictions. Some popular examples of dense vector representations include, but are not limited to, Word2Vec, Global Vectors for Word Representations (GloVe), FastText, and BERT.

After the input embedding layer, positional encoding 301 is added to the input embedding to provide position information to the model. The positional encoding 301 and the input embedding 300 may be added using a function 310. Since the Transformer architecture doesn't have inherent recurrence or convolution, positional encodings help capture the order and relative positions of tokens. The positional encodings are typically sine and cosine functions of different frequencies, allowing the model to learn relative positions. The positional encodings have the same dimensionality as the input embeddings and are summed with them.

The Encoder utilizes a multi-head attention mechanism 324 which is a key component of the Transformer architecture. It allows the Encoder to attend to different parts of the input sequence and capture dependencies between tokens. The attention mechanism computes three matrices: Query (Q), Key (K), and Value (V). The Query, Key, and Value matrices are obtained by linearly projecting the input embeddings using learned weight matrices. The attention scores are computed by taking the dot product of the Query matrix with the transpose of the Key matrix, followed by scaling and applying a softmax function. The attention scores determine the importance of each token in the input sequence for a given position. The Value matrix is then multiplied with the attention scores to obtain the weighted sum of the values, which forms the output of the attention mechanism. Multi-Head Attention splits the Query, Key, and Value matrices into multiple heads, allowing the model to attend to different aspects of the input simultaneously. The outputs from each head are concatenated and linearly projected to obtain the final output of the Multi-Head Attention layer 324.

After the Multi-Head Attention layer, a residual connection is applied, followed by Layer Normalization at add and norm 323. The residual connection adds the input embeddings to the output of the attention layer, helping the model learn faster and deeper. Layer Normalization normalizes the activations across the features, stabilizing the training process.

The Feed Forward layer 322 is a fully connected neural network applied to each position of the Encoder's hidden states. It consists of two linear transformations with a Rectified Linear Unit (ReLU) activation function in between. The purpose of the Feed Forward layer is to introduce non-linearity and increase the model's capacity to learn complex representations. The output of the Feed Forward layer has the same dimensionality as the input embeddings. A residual connection and Layer Normalization 321 are applied after the Feed Forward layer.

The Encoder layers 320 are stacked Nx times, where N is a hyperparameter that determines the depth of the Encoder. Each layer follows the same structure: Multi-Head Attention, Add & Norm, Feed Forward, and Add & Norm. By stacking multiple Encoder layers, the model can capture hierarchical and long-range dependencies in the input sequence. The output of the final Encoder layer represents the encoded input sequence, which is then passed to the Decoder for generating the output sequence.

The Decoder generates the output probabilities. It has a similar structure to the Encoder, with a few additions. The Decoder takes output embeddings and processes them through a stack of layers (represented as dashed box 350). The output embedding layer 330 takes the previous output tokens (shifted right by one position) and converts them into dense vectors. Each token is mapped to a learnable embedding vector of a fixed size. The embedding vectors capture semantic and syntactic relationships between tokens.

Positional encoding 301 is added to the output embedding 330 to provide position information to the model. Positional encoding 301 may be added to the output embedding 330 through a function 340. Since the Transformer architecture does not have inherent recurrence or convolution, positional encodings help capture the order and relative positions of tokens. The positional encodings are typically sine and cosine functions of different frequencies, allowing the model to learn relative positions.

The masked multi-head attention 351 mechanism prevents the model form attending to future tokens. This layer performs self-attention on the Decoder's input sequence. It allows the Decoder to attend to different parts of its own input sequence. The attention is "masked" to prevent the Decoder from attending to future tokens, ensuring that the predictions are based only on the previously generated tokens. Multi-head attention splits the input into multiple heads, allowing the model to attend different aspect of the input simultaneously.

After the masked multi-head attention, a residual connection is applied follows by layer normalization via add and norm 352. The residual connection adds the input to the output of the attention layer, helping the model learn faster and deeper. Layer normalization normalizes the activations across the features, stabilizing the training process.

The multi-head attention 353 layer performs attention between the Decoder's hidden states and the Encoder's output. It allows the Decoder to attend to relevant parts of the input sequence based on the Encoder's representations. The attention weights are computed based on the compatibility between the Decoder's hidden states and Encoder's outputs.

Another add and norm 354 layer is then followed by feed forward network 355. This a fully connected feed-forward network applied to each position of the Decoder's hidden states. It consists of two linear transformations with a Rectified Linear Unit (ReLU) activation in between. The feed forward layer helps the model capture non-linear interactions and increases the model's capacity.

Another add and norm 356 layer is followed by linear 360 and softmax 370 layers. The final hidden states of the Decoder are passed through a linear transformation to project them into the vocabulary space. Vocabulary space refers to the set of all unique tokens or words that the model can generate or predict. In the context of language models, the vocabulary is a predefined set of tokens that the model is trained on and can output. When the Decoder's final hidden states are passed through a linear transformation, they are projected into a vector space with the same dimensionality as the size of the vocabulary. Each dimension in this space corresponds to a specific token in the vocabulary. For example, the model has a vocabulary of 10,000 unique tokens. The linear transformation would project the Decoder's hidden states into a 10,000-dimensional vector space. Each element in this vector represents the model's predicted probability or score for the corresponding token in the vocabulary.

A softmax function is applied to the projected values (vectors) to generate output probabilities over the vocabulary. The softmax function normalizes the values so that they sum up to 1, representing a probability distribution over the vocabulary. Each probability indicates the likelihood of a specific token being the next output token. The token with the highest probability is selected as the next output token. During the model's training, the objective is to maximize the probability of the correct next token given the input sequence and the previously generated tokens. The model learns to assign higher probabilities to the tokens that are more likely to appear based on the context. At inference time, the token with the highest probability in the vocabulary space is selected as the next output token. This process is repeated iteratively, with the generated token being fed back into the Decoder as input for the next step, until a stopping criterion is met (e.g., reaching a maximum length or generating an end-of-sequence token). The size and composition of the vocabulary can vary depending on the specific task and the data the model is trained on. It can include words, sub-words, or even characters, depending on the tokenization strategy used.

The Decoder layers 350 can be stacked Nx times, allowing the model to capture complex dependencies and generate coherent output sequences.

This transformer architecture allows the model to process input sequences, capture long-range dependencies, and generate output sequence based on the encoded input and the previously generated codewords.

There are at least three variations of transformer architecture that may enable an LCM. A first such variation comprises Auto-Encoding Models. In autoencoders, the decoder portion of the transformer is discarded after pre-training and only the encoder is used to generate the output. The popular BERT and ROBERTa models are examples of models based on this architecture and perform well on sentiment analysis and text classification. These types of models may be trained using a process called masked language modeling (MLM).

The primary goal of an autoencoder is to learn efficient representations of input data by encoding the data into a lower-dimensional space and then reconstructing the original data from the encoded representation. Autoencoders are trained in an unsupervised manner, meaning they don't require labeled data. They learn to capture the underlying structure and patterns in the input data without explicit guidance. An autoencoder consists of two main components: an encoder and a decoder. The encoder takes the input data and maps it to a lower-dimensional representation, often referred to as the latent space or bottleneck. The decoder takes the latent representation and tries to reconstruct the original input data. Autoencoders can be used for dimensionality reduction by learning a compressed representation of the input data in the latent space. The latent space has a lower dimensionality than the input data, capturing the most salient features or patterns. The training objective of an autoencoder is to minimize the reconstruction error between the original input and the reconstructed output. The model learns to encode and decode the data in a way that preserves the essential information needed for reconstruction. Variants and extensions of autoencoders can include denoising autoencoders, variational autoencoders (VAEs) which introduce a probabilistic approach to autoencoders wherein they learn a probabilistic encoder and decoder, allowing for generating new samples from the learned latent space, and conditional autoencoders which incorporate additional conditions or labels as input to the encoder and decoder, enabling the generation of samples conditioned on specific attributes.

Autoencoders can have various applications. Autoencoders can be used to detect anomalies by measuring the reconstruction error. Anomalous samples tend to have higher reconstruction errors compared to normal samples. Autoencoders can be used as a pre-training step to learn meaningful features from unlabeled data. The learned features can then be used for downstream tasks like classification or clustering. Additionally, or alternatively, autoencoders, particularly VAEs, can be used as generative models to generate new samples similar to the training data by sampling from the learned latent space. It's worth noting that while autoencoders can be effective for certain tasks, they have some limitations. They may struggle to capture complex dependencies and may generate blurry or less sharp reconstructions compared to other generative models like Generative Adversarial Networks (GANs).

Another type of variation is the auto-regressive model which feature the use of only the decoder portion of the transformer architecture. In autoregressive architectures, the decoder portion of the transformer is retained and the encoder portion is not used after model pre-training. Auto-regressive models are a class of models that generate outputs by predicting the next element based on the previously generated elements. In the context of the Transformer architecture and language modeling, auto-regressive models are commonly used for tasks such as text generation, machine translation, and language understanding.

Auto-regressive models generate outputs sequentially, one element at a time. In the case of language modeling, the model predicts the next word or token based on the previous words or tokens in the sequence. The prediction of the next element is conditioned on the previously generated elements. The model learns the conditional probability distribution $P(x\_t|x\_1, x\_2, \ldots, x\_\{t-1\})$, where $x_t$ is the element at position t, and $x\_1, x\_2, \ldots, x\_\{t-1\}$ are the previously generated elements. The Transformer architecture, particularly the Decoder component, is well-suited for auto-regressive modeling. The Decoder generates the output sequence one element at a time, conditioned on the previously generated elements and the encoded input sequence from the Encoder. In the Transformer Decoder, the self-attention mechanism is masked to prevent the model from attending to future positions during training. This masking ensures that the model relies only on the previously generated elements to make predictions, following the autoregressive property. During training, the Transformer Decoder uses a technique called teacher forcing. Instead of feeding the model's own predictions as input for the next step, the ground truth target sequence is used. This helps the model learn to generate the correct output sequence based on the input sequence and the previous target tokens. During inference or generation, the Transformer Decoder generates the output sequence one element at a time. At each step, the model takes the previously generated elements as input and predicts the next element. This process continues until a stopping criterion is met, such as reaching a maximum sequence length or generating an end-of-sequence token. Auto-regressive models, including the Transformer, have achieved state-of-the-art performance in language modeling tasks. They excel at capturing the statistical properties and dependencies in sequential data, making them effective for generating coherent and fluent text.

While text generation is the most suitable use case of auto-regressors, they perform exceptionally well on a wide variety of tasks. Most modern LLMs are auto-regressors including, for example, the popular GPT series of LLMs, BERT, and XLNet.

The third variation of the transformer model is the sequence-to-sequence model which utilizes both the encoder and decoder portions of the transformer and can be trained in multiple ways. One of the methods is span corruption and reconstruction. These models are, generally, best suited for language translation. The T5 and BART family of models are examples of sequence-to-sequence models.

Figure 4:
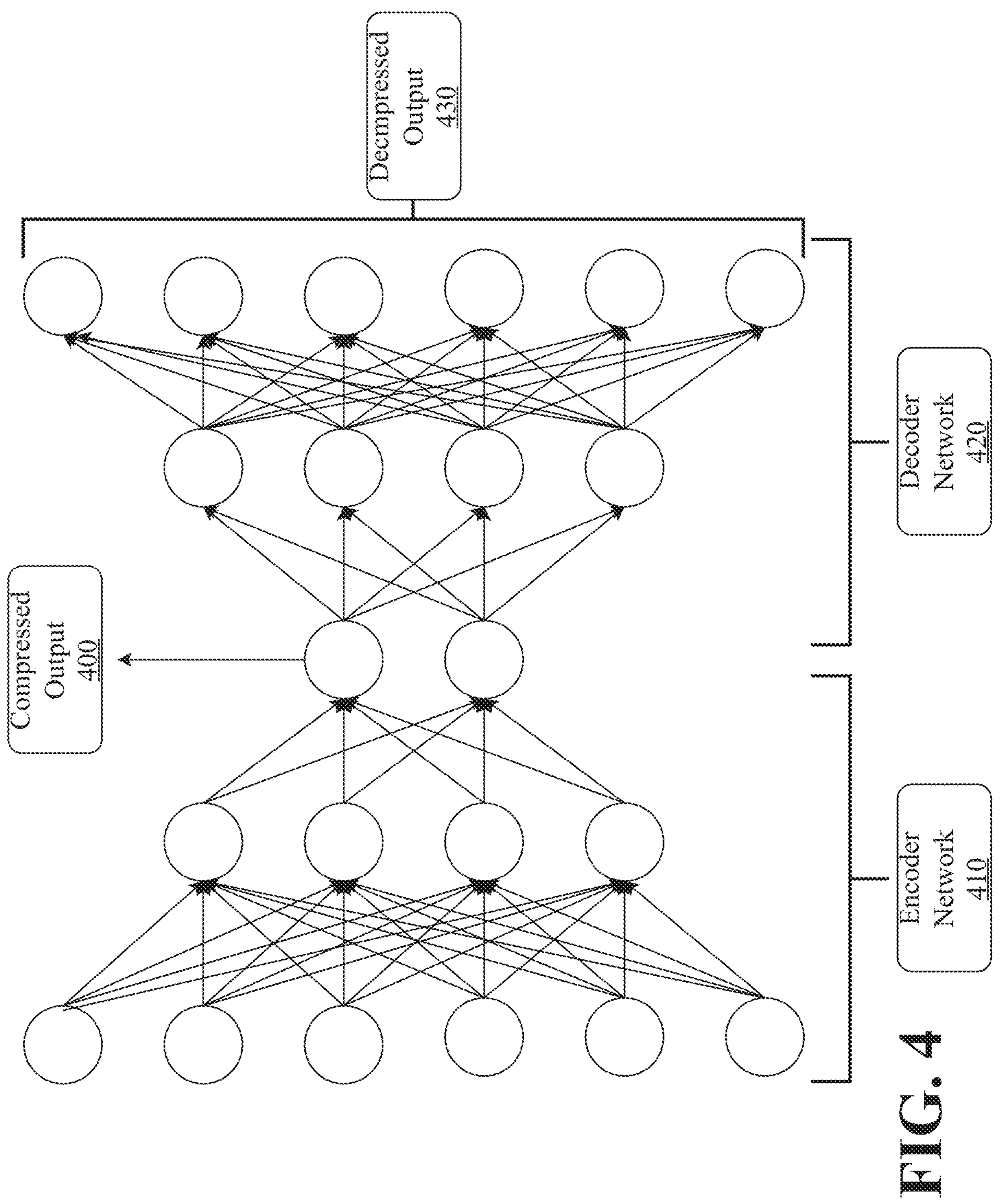
FIG. 4 is a block diagram illustrating an embodiment of the system and method for a large codeword model for deep learning, where the machine learning core is a VAE-based core.

FIG. 4 is a block diagram illustrating an embodiment of the system and method for a large codeword model for deep learning, where the machine learning core is a VAE-based core. An autoencoder network comprises an encoder network 410 or a decoder network 420 that work together to encode and decode data effectively. The encoder network 410 and decoder network 420 within the autoencoder network is comprised of a plurality of layers that contribute to the encoding and decoding process. These layers include, but are not limited to, convolutional layers, pooling layers, and a bottleneck layer. Some embodiments also include functions that operate on information including but not limited to rectified linear unit functions, sigmoid functions, and skip connections.

The convolutional layers are responsible for extracting meaningful features from the input data. They apply convolutional operations using learnable filters to capture spatial patterns and hierarchical representations of the data. The convolutional layers can have different numbers of filters, kernel sizes, and strides to capture features at various scales and resolutions. Skip connections are employed to facilitate the flow of information across different layers of the autoencoder. Skip connections allow the output of a layer to be directly added to the output of a subsequent layer, enabling the network to learn residual mappings and mitigate the vanishing gradient problem. Skip connections help in preserving fine-grained details and improving the training stability of the autoencoder.

Pooling layers are used to downsample the feature maps generated by the convolutional layers. They reduce the spatial dimensions of the feature maps while retaining the most salient information. Common pooling operations include but are not limited to max pooling and average pooling. Pooling layers help in achieving translation invariance, reducing computational complexity, and controlling the receptive field of the autoencoder. Rectified Linear Unit (ReLU) functions introduce non-linearity into the autoencoder by applying a ReLU activation function element-wise to the output of the previous layer. ReLU functions help in capturing complex patterns and relationships in the data by allowing the network to learn non-linear transformations. They also promote sparsity and alleviate the vanishing gradient problem. The bottleneck layer represents the most compressed representation of the input data. The bottleneck layer has a significantly reduced dimensionality compared to the input and output layers of the autoencoder. It forces the network to learn a compact and meaningful encoding of the data, capturing the essential features and discarding redundant information. In one embodiment, the multi-layer autoencoder network is comprised of a plurality of the previously mentioned layers where the sequence and composition of the layers may vary depending on a user's preferences and goals. The bottleneck layer is where the compressed output 400 is created. Each layer previous to the bottleneck layer creates a more and more compressed version of the original input. The layers after the bottleneck layer represent the decoder network 430 where a plurality of layers operate on a compressed input to decompress a data set. Decompression results in a version of the original input which is largely similar but has some lost data from the transformations.

Figure 5:
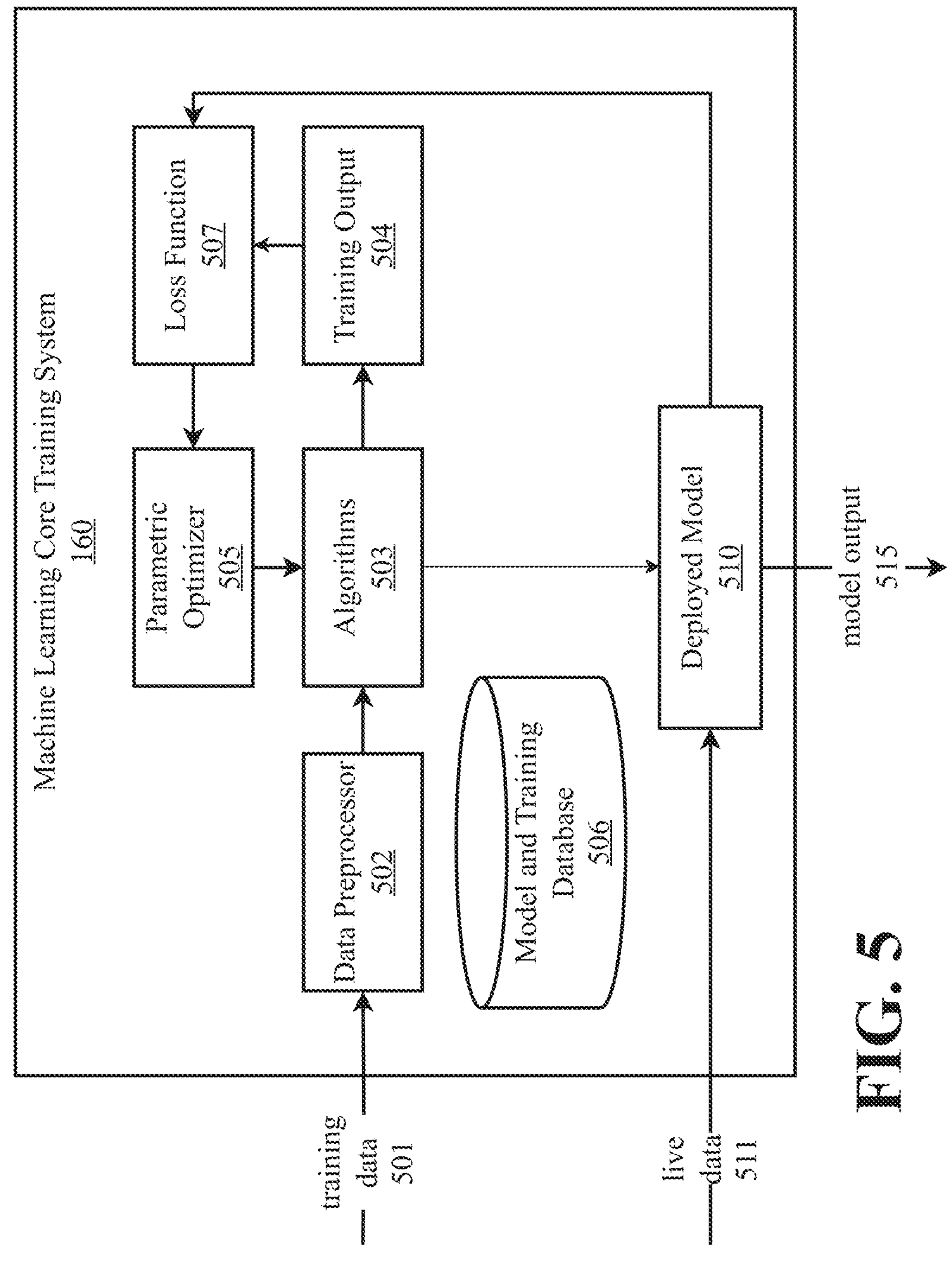
FIG. 5 is a block diagram illustrating an aspect of system and method for a large codeword model for deep learning, a machine learning core training system.

FIG. 5 is a block diagram illustrating an aspect of system and method for a large codeword model for deep learning, a machine learning core training system. According to the embodiment, the machine learning core training system 160 may comprise a model training stage comprising a data preprocessor 502, one or more machine and/or deep learning algorithms 503, training output 504, and a parametric optimizer 505, and a model deployment stage comprising a deployed and fully trained model 510 configured to perform tasks described herein such as processing codewords through a large codeword model. The machine learning core training system 160 may be used to train and deploy a plurality of machine learning architectures in order to support the services provided by the large codeword model for deep learning.

At the model training stage, a plurality of training data 501 may be received by the generative AI training system 550. Data preprocessor 502 may receive the input data (e.g., codewords, sourceblocks) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 502 may also be configured to create training dataset, a validation dataset, and a test set from the plurality of input data 501. For example, a training dataset may comprise 80% of the preprocessed input data, the validation set 10%, and the test dataset may comprise the remaining 10% of the data. The preprocessed training dataset may be fed as input into one or more machine and/or deep learning algorithms 503 to train a predictive model for object monitoring and detection.

During model training, training output 504 is produced and used to measure the accuracy and usefulness of the predictive outputs. During this process a parametric optimizer 505 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by the machine learning core training system 160 to evaluate a model's performance. Metrics can include, but are not limited to, word error rate (WER), word information loss, speaker identification accuracy (e.g., single stream with multiple speakers), inverse text normalization and normalization error rate, punctuation accuracy, timestamp accuracy, latency, resource consumption, custom vocabulary, sentence-level sentiment analysis, multiple languages supported, cost-to-performance tradeoff, and personal identifying information/payment card industry redaction, to name a few. In one embodiment, the system may utilize a loss function 507 to measure the system's performance. The loss function 507 compares the training outputs with an expected output and determined how the algorithm needs to be changed in order to improve the quality of the model output. During the training stage, all outputs may be passed through the loss function 507 on a continuous loop until the algorithms 503 are in a position where they can effectively be incorporated into a deployed model 515.

The test dataset can be used to test the accuracy of the model outputs. If the training model is establishing correlations that satisfy a certain criterion such as but not limited to quality of the correlations and amount of restored lost data, then it can be moved to the model deployment stage as a fully trained and deployed model 510 in a production environment making predictions based on live input data 511 (e.g., interest factor data, incentive data). Further, model correlations and restorations made by deployed model can be used as feedback and applied to model training in the training stage, wherein the model is continuously learning over time using both training data and live data and predictions. A model and training database 506 is present and configured to store training/test datasets and developed models. Database 506 may also store previous versions of models.

According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 503 may comprise a deep learning algorithm such as neural networks (e.g., recurrent, convolutional, long short-term memory networks, etc.).

In some implementations, the machine learning core training system 160 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 506.

Figure 6:
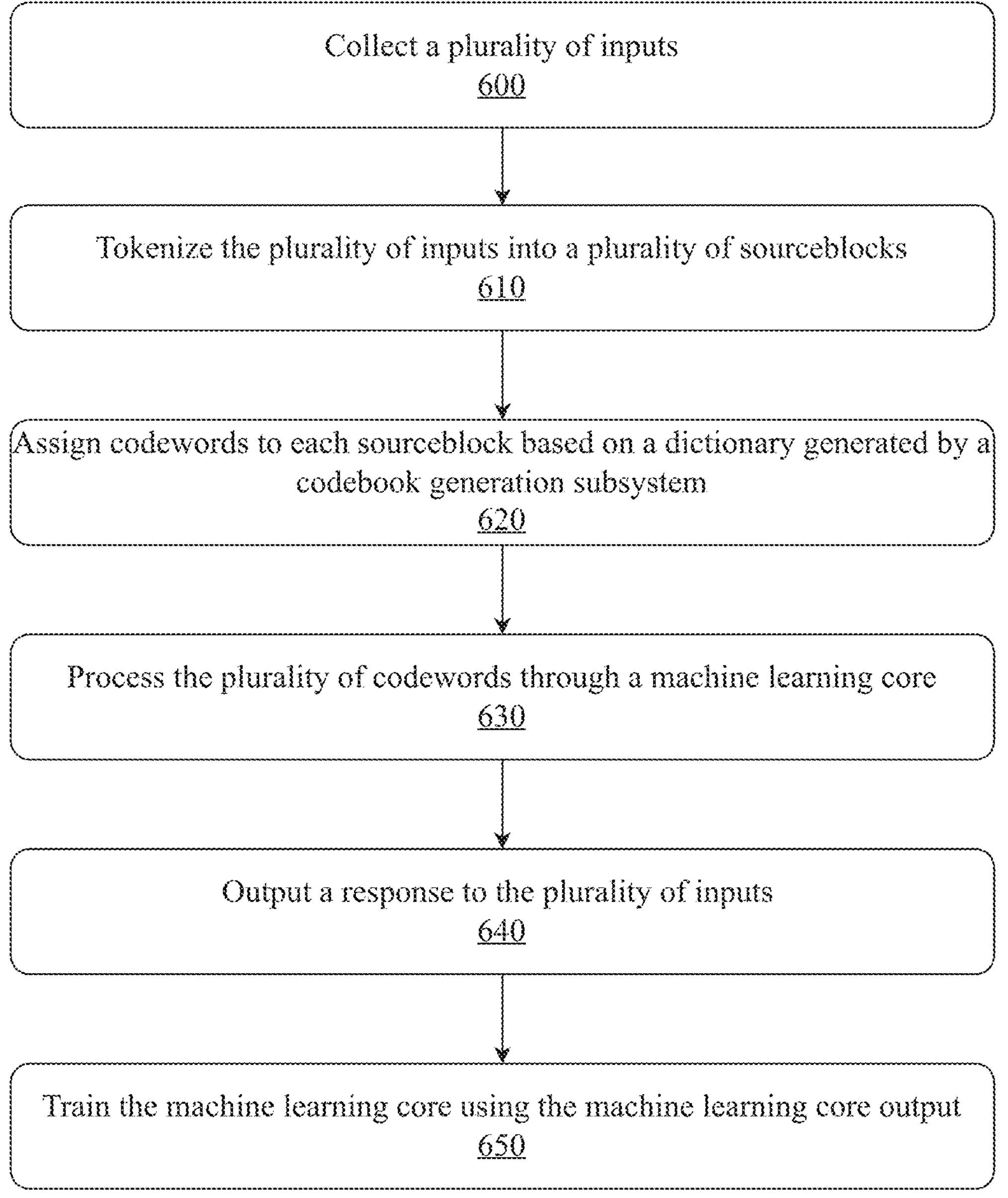
FIG. 6 is a flow diagram illustrating an exemplary method for a large codeword model for deep learning.

FIG. 6 is a flow diagram illustrating an exemplary method for a large codeword model for deep learning. In a first step 600, collect a plurality of inputs from various sources, such as user input, sensor data, or existing datasets. These inputs can be in different modalities, including text, images, audio, time series, or any other structured or unstructured format.

In a step 610, the collected inputs are tokenized into a plurality of sourceblocks. Tokenization is performed by the tokenizer component of the LCM architecture, which splits the input data into meaningful semantic units called sourceblocks. The tokenizer employs techniques like syntactic splitting or semantic splitting to capture the inherent structure and patterns in the data. For textual data, the tokenizer may use subword tokenization methods like Byte-Pair Encoding (BPE) or WordPiece. For other modalities, such as images or audio, the tokenizer may use domain-specific techniques to identify and extract relevant sourceblocks.

In a step 620, each sourceblock is assigned a unique codeword based on a dictionary generated by the codebook generation subsystem. The codebook generation subsystem creates and maintains a dictionary that maps sourceblocks to their corresponding codewords. Codewords are discrete, compressed representations of the sourceblocks, designed to capture the essential information in a compact form. The codeword assignment can be based on various techniques, such as frequency-based coding, hash functions, or learned mappings.

In a step 630, the assigned codewords are then processed through the machine learning core of the LCM. The machine learning core is the central component of the LCM architecture, responsible for learning and generating responses based on the input codewords. It can be implemented using various configurations, such as a Transformer-based core, a Variational Autoencoder (VAE)-based core, or a combination of different architectures. The machine learning core learns to map input codeword sequences to output codeword sequences, capturing the patterns, relationships, and semantics within the data.

In a step 640, the machine learning core generates an output response. The output response can be in the form of codewords, which are then mapped back to the corresponding sourceblocks or tokens using the inverse mapping scheme defined in the codebook. Alternatively, the output response can be directly generated in the target modality, such as text, images, or audio, depending on the specific application.

In a step 650, to improve the performance and adaptability of the LCM, the machine learning core is trained using the generated output. The training process involves comparing the generated output with the expected or desired output, and adjusting the parameters of the machine learning core accordingly. This can be done using techniques like backpropagation, gradient descent, or reinforcement learning, depending on the specific architecture and objective of the LCM. The training process allows the LCM to learn from its own outputs and continuously improve its performance over time.

Detailed Description of Exemplary Aspects

Figure 19:
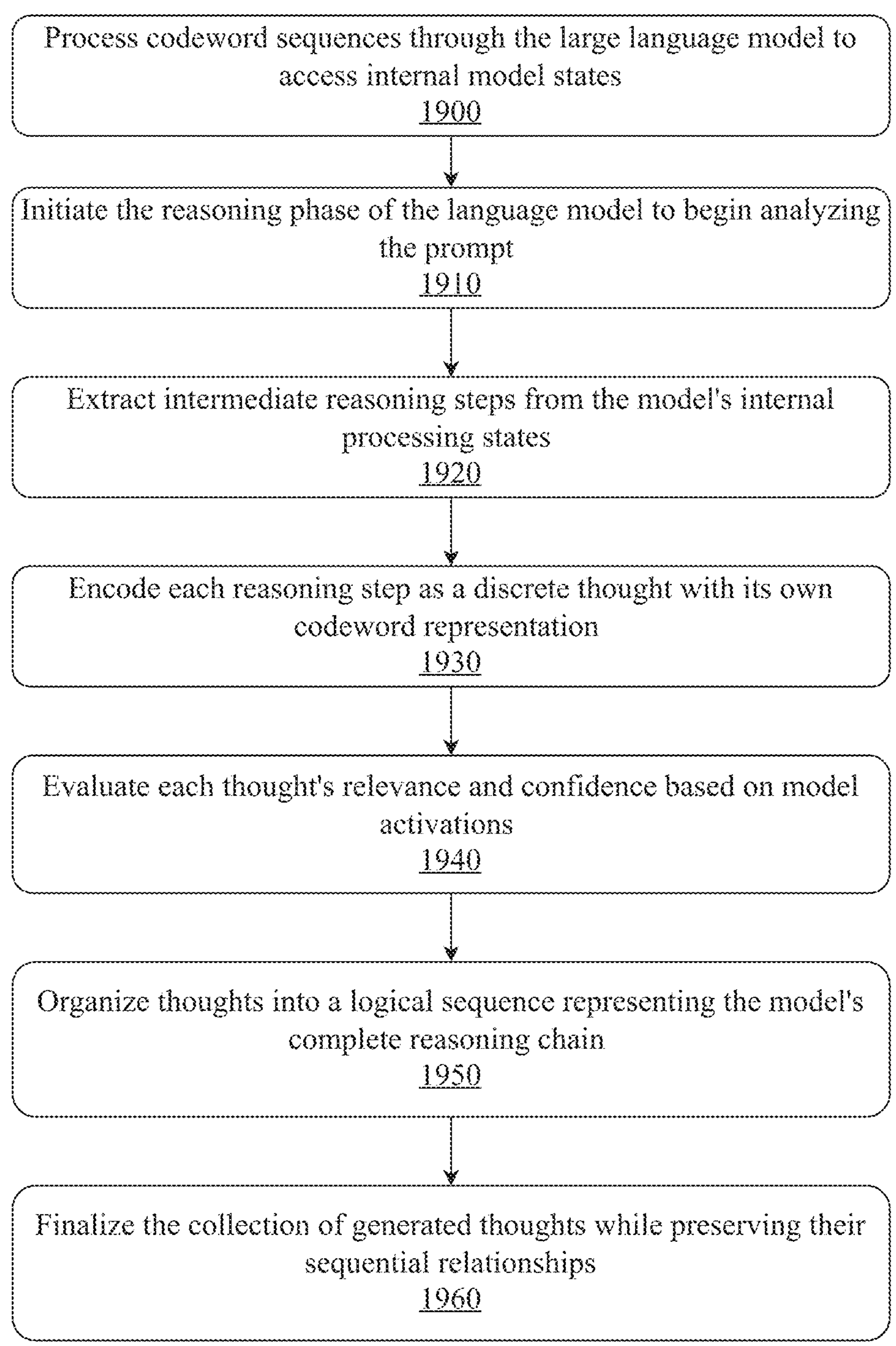
FIG. 19 is a flow diagram illustrating an exemplary method for generating thoughts using a large codeword model.

FIG. 19 is a flow diagram illustrating an exemplary method for generating thoughts using a large codeword model. This method details the sequential steps involved in extracting, encoding, evaluating, and organizing the model's internal reasoning processes into discrete thought units represented as codewords.

In a first step 1900, the system processes codeword sequences through the large language model to access internal model states. This involves feeding the input codewords, which represent the user's prompt or query, into the large language model and allowing the model to begin its processing. During this step, the system gains access to the model's internal representations, including but not limited to hidden states, attention patterns, and contextual information, which form the basis for extracting the model's reasoning process.

In a step 1910, the system initiates the reasoning phase of the language model to begin analyzing the prompt. This step activates a dedicated reasoning mode within the model, where it performs a more deliberate and structured analysis of the input. This reasoning phase involves deeper processing of the input content, identification of key concepts and relationships, and activation of relevant knowledge and reasoning patterns stored within the model's parameters.

In a step 1920, the system extracts intermediate reasoning steps from the model's internal processing states. This step involves analyzing the model's internal activations and identifying patterns that correspond to distinct reasoning operations or analytical steps. The extraction process focuses on capturing the sequential thought process that the model employs while formulating its response, including steps such as factual recall, inference, hypothesis generation, and evaluation of alternatives.

In a step 1930, the system encodes each reasoning step as a discrete thought with its own codeword representation. Each identified reasoning step is mapped to a structured representation that captures its essential content and purpose. This structured representation is then encoded using the system's codeword vocabulary, transforming the reasoning step into a compact and efficient format that preserves its semantic content. The encoding process ensures that each thought is represented in a standardized format that can be easily stored, retrieved, and processed.

In a step 1940, the system evaluates each thought's relevance and confidence based on model activations. This step involves assessing the importance and reliability of each extracted thought by analyzing the strength and pattern of the model's activations associated with that thought. Thoughts with stronger activations or more coherent patterns may be assigned higher confidence scores, indicating greater reliability or importance in the overall reasoning process.

In a step 1950, the system organizes thoughts into a logical sequence representing the model's complete reasoning chain. This step involves arranging the extracted thoughts in a sequence that reflects their logical and causal relationships. The organization process may identify precursor-successor relationships, supporting or contradicting relationships, and hierarchical structures among the thoughts, creating a coherent representation of the model's entire reasoning process.

In a step 1960, the system finalizes the collection of generated thoughts while preserving their sequential relationships. This step involves preparing the organized thoughts for storage or further processing, ensuring that the relationships and metadata associated with each thought are properly preserved. The finalized collection of thoughts represents a complete and structured record of the model's reasoning process, captured in an efficient codeword representation that can be stored, retrieved, and utilized in future operations.

Figure 20:
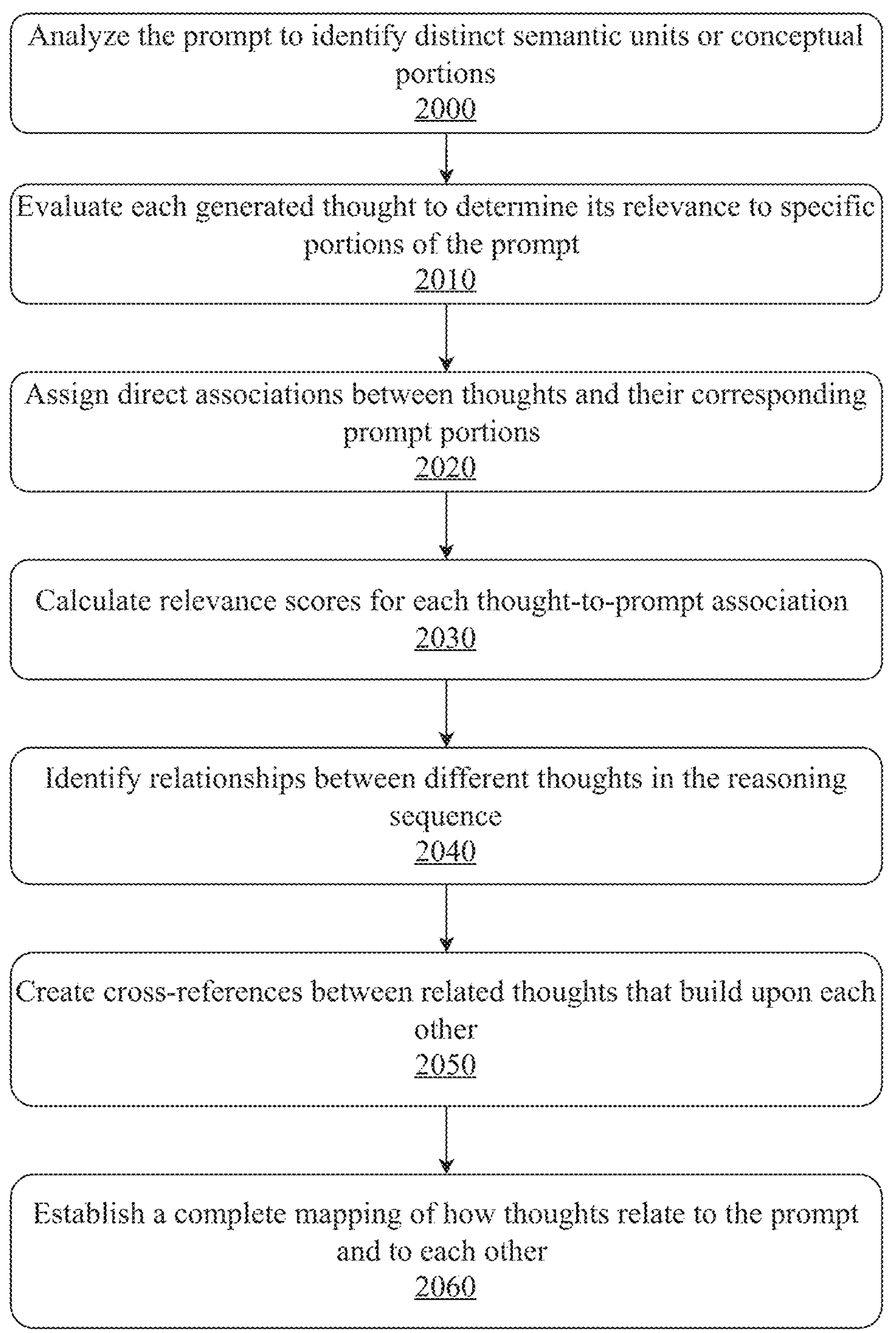
FIG. 20 is a flow diagram illustrating an exemplary method for associating generated thoughts with specific portions of the input prompt.

FIG. 20 is a flow diagram illustrating an exemplary method for associating generated thoughts with specific portions of the input prompt. This method details the systematic process of analyzing the relationships between the model's reasoning steps and the various components of the user's query, enabling a structured mapping between thoughts and the content that triggered them.

In a first step 2000, the system analyzes the prompt to identify distinct semantic units or conceptual portions. This step involves breaking down the input prompt into meaningful segments that represent distinct concepts, questions, constraints, or requirements. The segmentation process may employ natural language processing techniques such as syntactic parsing, named entity recognition, or semantic role labeling to identify coherent semantic units within the prompt. For example, a prompt asking about the economic impacts of climate change might be segmented into portions related to "economic factors," "climate change mechanisms," and "impact assessment."

In a step 2010, the system evaluates each generated thought to determine its relevance to specific portions of the prompt. This step involves analyzing the content and purpose of each thought in relation to the identified prompt segments. The evaluation process examines the semantic overlap, conceptual relevance, and functional relationship between each thought and the various prompt segments. This step identifies which segments of the prompt each thought is addressing or responding to.

In a step 2020, the system assigns direct associations between thoughts and their corresponding prompt portions. Based on the relevance evaluation, the system creates explicit links between each thought and the specific prompt segments it relates to. These associations establish a clear mapping of which thoughts address which aspects of the user's query, enabling targeted retrieval and utilization of relevant thoughts.

In a step 2030, the system calculates relevance scores for each thought-to-prompt association. This step involves quantifying the strength and specificity of the relationship between each thought and its associated prompt segments. The relevance scores may be based on semantic similarity measures, attention weights from the model, or other metrics that indicate how directly a thought addresses a particular prompt segment. These scores provide a numerical representation of the relevance hierarchy, enabling more precise thought retrieval and utilization.

In a step 2040, the system identifies relationships between different thoughts in the reasoning sequence. This step involves analyzing how various thoughts relate to and interact with each other within the overall reasoning process. The system detects patterns such as prerequisite relationships, where one thought builds upon another; supporting relationships, where one thought provides evidence for another; or contradictory relationships, where thoughts present opposing perspectives or conclusions.

In a step 2050, the system creates cross-references between related thoughts that build upon each other. Based on the identified relationships, the system establishes explicit links between interconnected thoughts, capturing their logical and functional dependencies. These cross-references enable the system to understand and utilize the structural relationships within the reasoning chain, facilitating more coherent and contextually appropriate thought retrieval and application.

In a step 2060, the system establishes a complete mapping of how thoughts relate to the prompt and to each other. This step integrates the prompt-thought associations and the thought-thought relationships into a comprehensive structural representation of the reasoning process. This mapping captures the full context of each thought, including its trigger in the prompt, its role in the reasoning sequence, and its relationships with other thoughts. The complete mapping enables more sophisticated thought retrieval, combination, and application capabilities.

Figure 21:
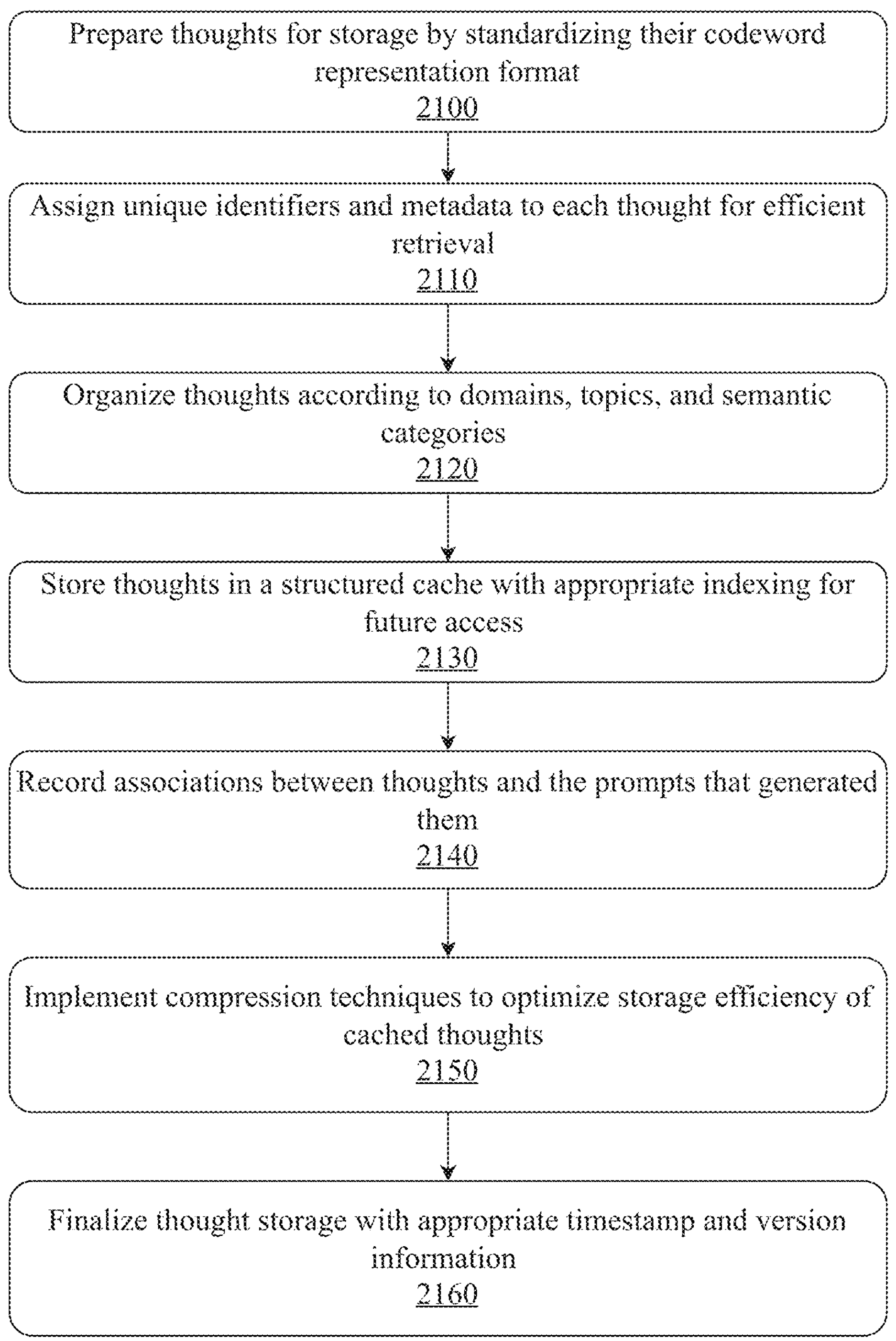
FIG. 21 is a flow diagram illustrating an exemplary method for caching generated thoughts in a structured and efficient manner.

FIG. 21 is a flow diagram illustrating an exemplary method for caching generated thoughts in a structured and efficient manner. This method details the systematic process of preparing, organizing, and storing thoughts represented as codewords, enabling their efficient retrieval and utilization in future operations.

In a first step 2100, the system prepares thoughts for storage by standardizing their codeword representation format. This step involves converting the thoughts into a consistent and well-defined format that facilitates efficient storage and retrieval. The standardization process ensures that all thoughts, regardless of their source or content, adhere to a uniform structure in their codeword representation. This might include normalizing sequence lengths, applying consistent encoding schemes, or implementing standard header formats that define the structure of the thought representation.

In a step 2110, the system assigns unique identifiers and metadata to each thought for efficient retrieval. Each thought is given a distinctive identifier that enables precise reference and access within the cache. Additionally, the system attaches relevant metadata to each thought, which may include information about the thought's content, purpose, confidence level, creation time, and relationships with other thoughts. This metadata enriches the thought representation and enables more sophisticated search and filtering operations during retrieval.

In a step 2120, the system organizes thoughts according to domains, topics, and semantic categories. This step involves categorizing the thoughts based on their subject matter, functional role, and semantic content. The categorization process creates a hierarchical or network-based organization of thoughts, enabling more efficient navigation and retrieval based on thematic or conceptual similarity. For example, thoughts related to economic analysis might be grouped together, as might thoughts that perform mathematical calculations or ethical evaluations.

In a step 2130, the system stores thoughts in a structured cache with appropriate indexing for future access. The thoughts are placed in a dedicated storage system that is optimized for quick and precise retrieval. This storage system implements various indexing strategies, such as vector-based similarity indexes, keyword indexes, or hierarchical category indexes, which enable the system to quickly locate relevant thoughts based on different query criteria. The structured cache may be implemented using technologies such as key-value stores, document databases, or specialized vector databases that are well-suited for storing and retrieving codeword sequences.

In a step 2140, the system records associations between thoughts and the prompts that generated them. This step involves explicitly storing the relationships between cached thoughts and the input prompts that triggered their creation. These associations enable context-aware thought retrieval, where the system can identify thoughts that were generated in response to similar or related prompts. By maintaining these prompt-thought associations, the system can more effectively leverage past reasoning for new but similar queries.

In a step 2150, the system implements compression techniques to optimize storage efficiency of cached thoughts. This step involves applying various methods to reduce the storage footprint of the cached thoughts without significant loss of information. Compression techniques might include eliminating redundancy across thoughts, using more compact encoding schemes for common patterns, or implementing hierarchical storage approaches where detailed information is selectively preserved based on importance. These compression methods enable more efficient use of storage resources while maintaining the utility of the cached thoughts.

In a step 2160, the system finalizes thought storage with appropriate timestamp and version information. Each cached thought is tagged with temporal metadata indicating when it was created and, if applicable, when it was modified. Version information may also be included to track changes or updates to the thought over time. This temporal and versioning metadata enables time-aware retrieval and helps maintain the coherence and accuracy of the thought cache over extended periods of use.

Figure 7:
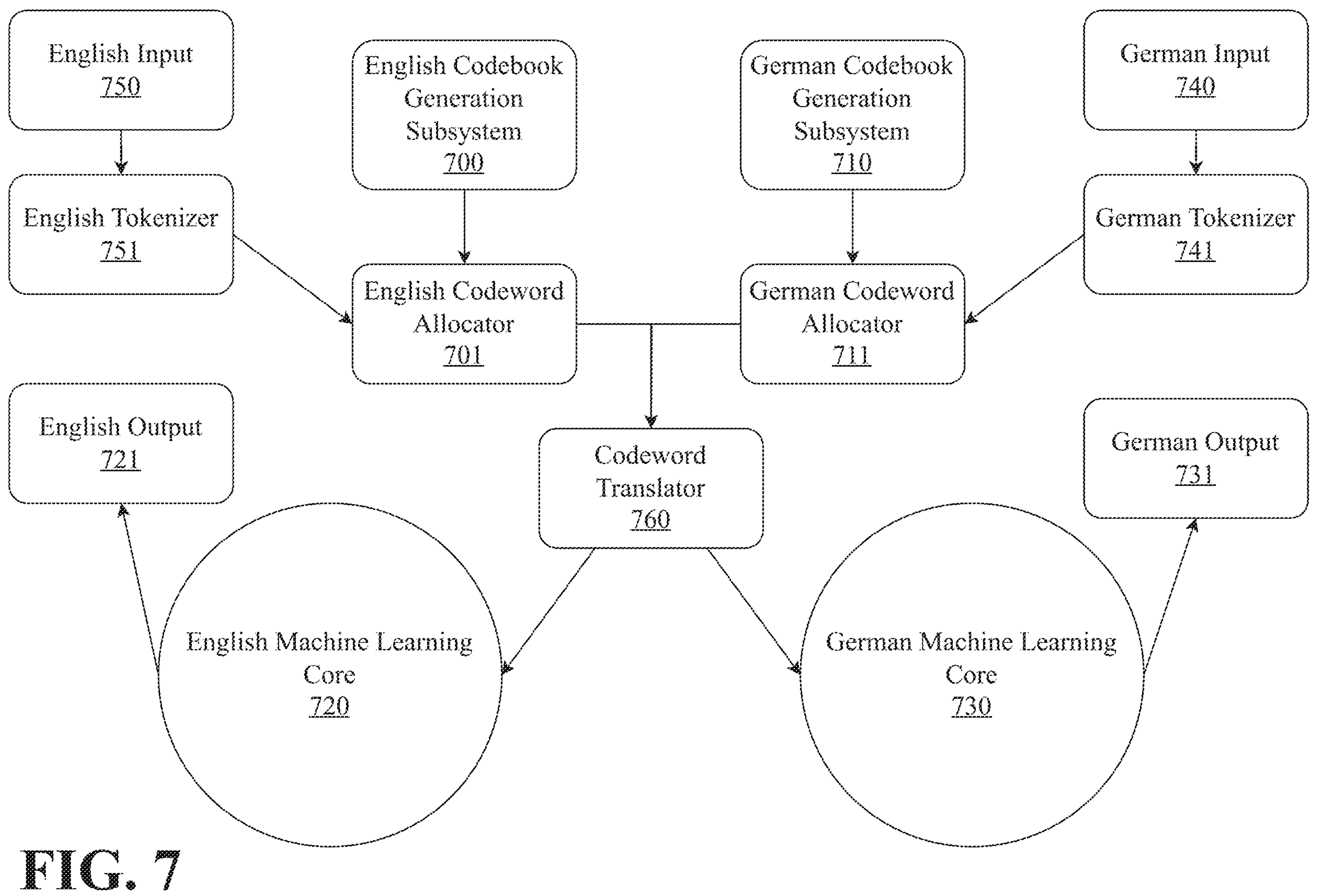
FIG. 7 is a block diagram illustrating an exemplary embodiment of a large codeword model where the model is configured to translate various language inputs.

FIG. 7 is a block diagram illustrating an exemplary embodiment of a large codeword model where the model is configured to translate various language inputs. The system consists of several key components that work together to enable translation between two languages, in this case, English and German. The system includes separate codebook generation subsystems, codeword allocators, and machine learning cores for each language, as well as a codeword translator that facilitates the translation process.

An English input 750 represents the source text or data that needs to be translated from English to German. This input is fed into an English tokenizer 751, which is responsible for tokenizing the English input into a plurality of sourceblocks. The English tokenizer 751 employs language-specific techniques, such as subword tokenization methods like Byte-Pair Encoding (BPE) or WordPiece, to split the input into meaningful semantic units that capture the linguistic structure and patterns of the English language.

The tokenized English sourceblocks are then processed by an English codebook generation subsystem 700. This subsystem generates and maintains a codebook specifically for the English language. The English codebook is a dictionary that maps each English sourceblock to a corresponding codeword. Codewords are discrete, compressed representations of the sourceblocks, designed to capture the essential linguistic information in a compact form. The codebook generation subsystem uses techniques like frequency-based coding, hash functions, or learned mappings to assign codewords to the sourceblocks. An English codeword allocator 701 takes the tokenized English sourceblocks and assigns the corresponding codewords from the English codebook. This process converts the English sourceblocks into a sequence of codewords that represent the English input in a compressed and efficient format.

The sequence of English codewords is then processed by an English machine learning core 720. This core is a specialized component of the LCM architecture that is trained specifically on the English language. It learns to map input codeword sequences to output codeword sequences, capturing the linguistic patterns, relationships, and semantics of the English language. The English machine learning core 720 may be implemented using various configurations, such as a Transformer-based core, a Variational Autoencoder (VAE)-based core, or a combination of different architectures, tailored to the characteristics of the English language.

The English machine learning core 720 generates an English output 721 in the form of a sequence of codewords. These codewords represent the translated content in the English language, encoded in the compressed codeword format.

To perform the translation from English to German, the system utilizes a codeword translator 760. The codeword translator 760 maps the English codewords to their corresponding German codewords. It learns the mappings between the codewords of the two languages, enabling cross-lingual translation. The codeword translator 760 can be implemented using various techniques, such as neural machine translation models, cross-lingual word embeddings, or learned mapping functions.

In the depicted case, the codeword translator 760 takes the English codeword output 721 and translates it into a sequence of German codewords. These German codewords represent the translated content in the German language, encoded in the compressed codeword format.

The translated German codewords are then processed by a German machine learning core 730. Similar to the English machine learning core 720, the German Machine Learning Core is a specialized component trained specifically on the German language. It learns to map input German codeword sequences to output sequences in the German language, capturing the linguistic patterns and semantics of German. The German machine learning core 730 generates a German output 731 based on the translated German codewords. This output represents the final translated content in the German language.

The system also includes a German codebook generation subsystem 710 and a German codeword allocator 711, which serve similar purposes as their English counterparts but are specific to the German language. These components handle the generation and allocation of German codewords based on a German input 740 and a German tokenizer 741. This system may be configured to handle any plurality of languages. The English and German codebooks and machine learning cores are simply examples. Likewise, a machine learning core may be trained to process any given language, depending on needs. The modular architecture of the system allows for flexibility and scalability in handling multiple languages. The system can be extended to support additional language pairs by incorporating language-specific codebook generation subsystems, codeword allocators, and machine learning cores, along with corresponding codeword translators. Sample PyTorch pseudocode for an exemplary LCM based translator may be found in APPENDIX: B.

Figure 8:
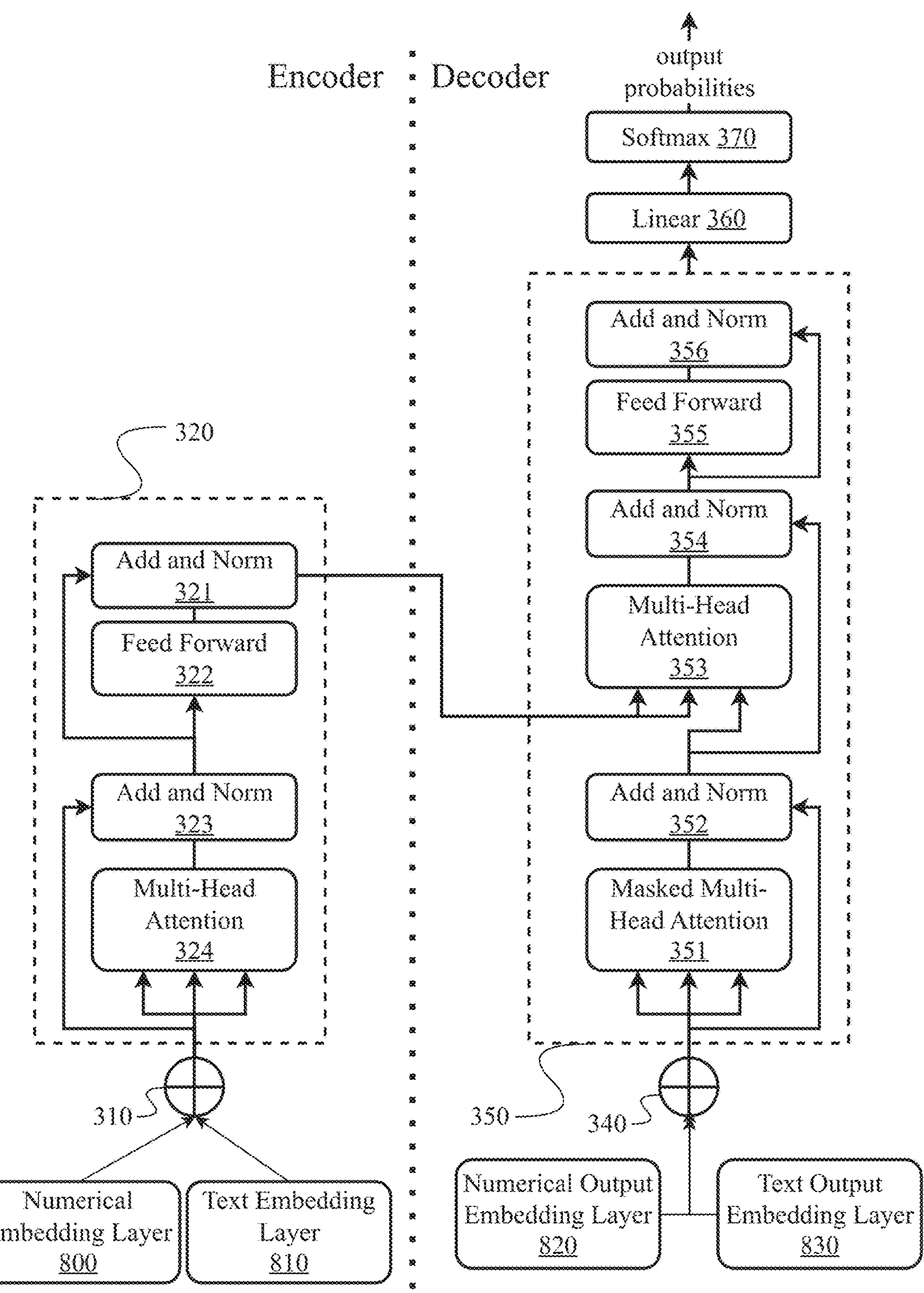
FIG. 8 is a block diagram illustrating an exemplary embodiment of a large codeword model with a dual embedding layer.

FIG. 8 is a block diagram illustrating an exemplary embodiment of a large codeword model with a dual embedding layer. The LCM may be configured to process inputs through a plurality of embedding layers. In one example, inputs of different modalities may be processed through a numerical embedding layer 800 and a text embedding layer 810. The numerical embedding layer 800 is responsible for processing numerical input data, mapping it into a dense vector representation. It learns to capture the relevant patterns and relationships within the numerical data. Similarly, the text embedding layer 810 handles the processing of textual input data, mapping each token to a dense vector representation and capturing the semantic and syntactic information present in the text.

The embedded vectors from each embedding layer may be concatenated to form a single input stream. To concatenate the numerical and text embeddings along the feature dimension, they have the same sequence length. This can be achieved by padding the shorter sequence or truncating the longer sequence to match the lengths. The numerical embeddings and text embeddings are then concatenated along the feature dimension. The feature dimensionality of the combined sequence is the sum of the embedding dimensions of the individual modalities. The combined input sequence contains information from both the numerical and text input data, with each position in the sequence representing a concatenation of the corresponding numerical and text embeddings.

The combined input sequence may then be passed through an encoder within a transformer. Inside the encoder, a multi-head attention 324 sub-layer performs self-attention on the combined input sequence. It allows the model to attend to different positions within the sequence and capture dependencies between the numerical and text features. The self-attention mechanism computes attention weights based on the similarity between different positions in the sequence, enabling the model to focus on relevant information. Feed forward layers within the transformer may learn to combine and transform features from all types of codewords, non-dependent on their original modality.

The single input stream is processed through the remainder of the transformer architecture, which is explained more in depth in FIG. 4. By concatenating the embeddings from different modalities and processing them through the Transformer architecture, the system can effectively learn and utilize the cross-modal interactions and dependencies. The self-attention mechanism in the Transformer allows the model to capture relationships between the numerical and text features at different positions in the sequence, enabling it to generate coherent and contextually relevant outputs.

The concatenation of embeddings along the feature dimension provides a flexible and extensible approach to integrating multiple input modalities. It allows the system to handle various data types and learn joint representations that leverage information from different sources. This approach can be extended to incorporate additional modalities by adding corresponding embedding layers and concatenating their outputs to the combined input sequence.

Figure 9:
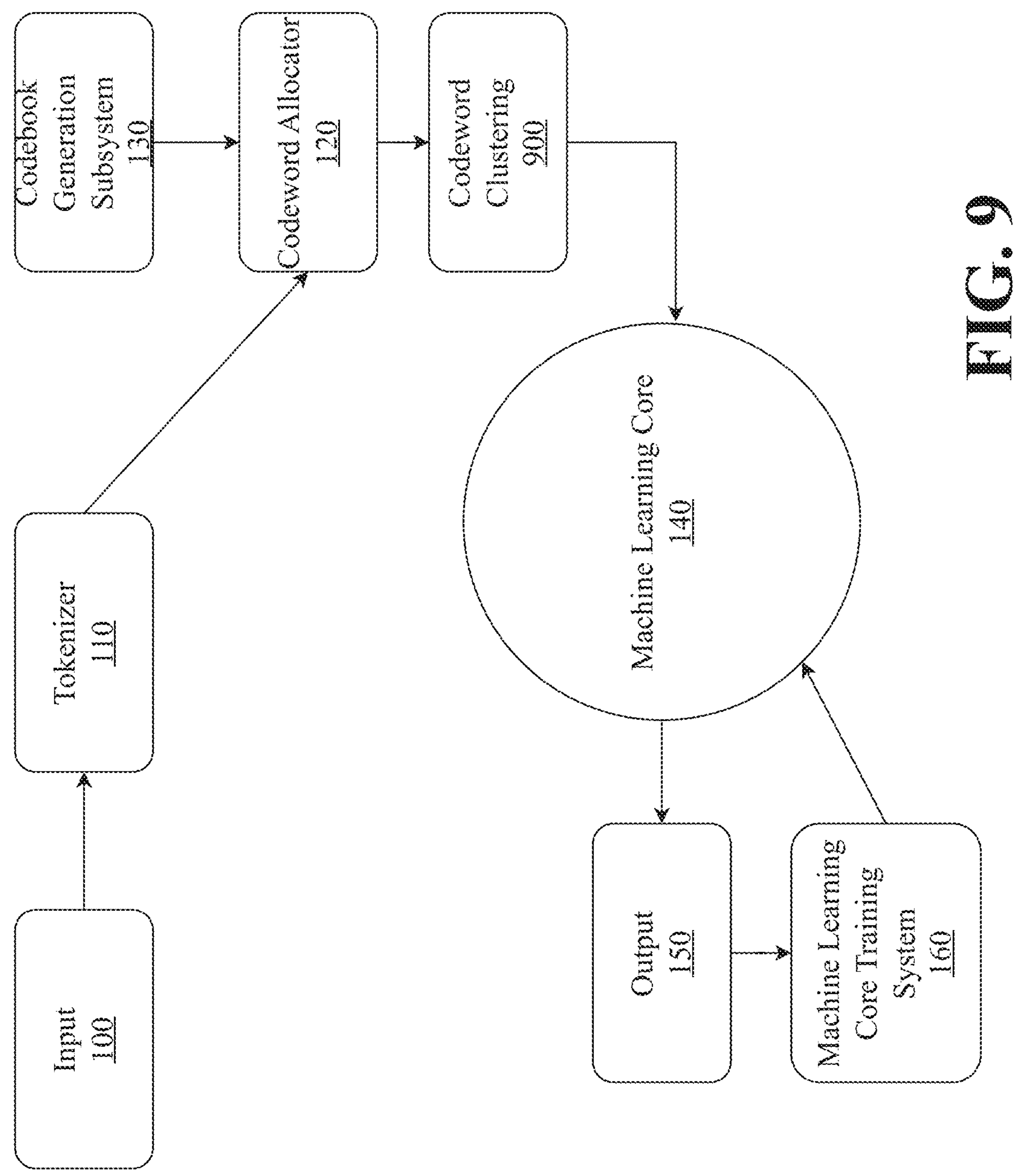
FIG. 9 is a block diagram illustrating an exemplary embodiment of a large codeword model which uses codeword clustering.

FIG. 9 is a block diagram illustrating an exemplary embodiment of a large codeword model which uses codeword clustering. This approach aims to capture semantic similarities and relationships among codewords, enabling more efficient and meaningful representations for downstream processing.

The system starts with an input 100, which receives the raw data that needs to be processed. This data can be in various formats, such as text, images, audio, or any other structured or unstructured data. The input data is then passed to a tokenizer 110, which is responsible for tokenizing the raw data into a sequence of smaller units called sourceblocks. The tokenization process depends on the specific data type and can involve techniques like subword tokenization, byte-pair encoding, or domain-specific tokenization methods.

After tokenization, the sourceblocks are sent to a codeword allocator 120. The codeword allocator 120 assigns a unique codeword to each sourceblock based on a predefined codebook generated by a codebook generation subsystem 130. The codebook is a mapping between sourceblocks and their corresponding codewords, which are compact and discrete representations of the sourceblocks. The codebook generation subsystem 130 uses techniques like frequency-based coding, hash functions, or learned mappings to generate the codebook.

The assigned codewords are then passed to the codeword clustering 900 component, which groups semantically similar or related codewords together based on their co-occurrence patterns or semantic proximity in the training data. This clustering process aims to capture the underlying semantic structure and relationships among the codewords. Various clustering algorithms can be employed in the codeword clustering 900 component, such as k-means clustering, hierarchical clustering, or density-based clustering. The choice of the clustering algorithm depends on the specific characteristics of the data and the desired granularity of the clusters. The clustering process takes into account the semantic similarity between codewords, which can be measured using techniques like cosine similarity, Euclidean distance, or other similarity metrics.

Once the codewords are clustered, the system learns individual vector embeddings for each cluster of codewords, rather than learning embeddings for individual codewords. This approach reduces the dimensionality of the embedding space and allows for more efficient representation learning. The clustered codewords are mapped to dense vector representations in a continuous vector space, capturing the semantic and syntactic information of the codewords within each cluster.

The vector embeddings of the clustered codewords may then processed by the machine learning core 140. The machine learning core 140 is responsible for learning and generating meaningful representations and outputs based on the input codeword embeddings. It can consist of various architectures, such as Transformer models, recurrent neural networks, or convolutional neural networks, depending on the specific task and data type. An output 150 is generated by the machine learning core 140 and is based on the processed codeword embeddings from the machine learning core 140. The output can be in various formats, such as text, images, or any other desired representation, depending on the specific application.

The incorporation of codeword clustering before vector embedding in the LCM architecture brings several benefits. By grouping semantically similar codewords together, the system can learn more meaningful and compact representations, reducing the dimensionality of the embedding space. This can lead to improved efficiency in terms of memory and computational resources. Moreover, the clustered codeword embeddings can capture higher-level semantic concepts and relationships, enabling the system to generalize better to unseen or rare codewords. The clustering process helps in handling data sparsity and can improve the robustness and interpretability of the learned representations.

Figure 10:
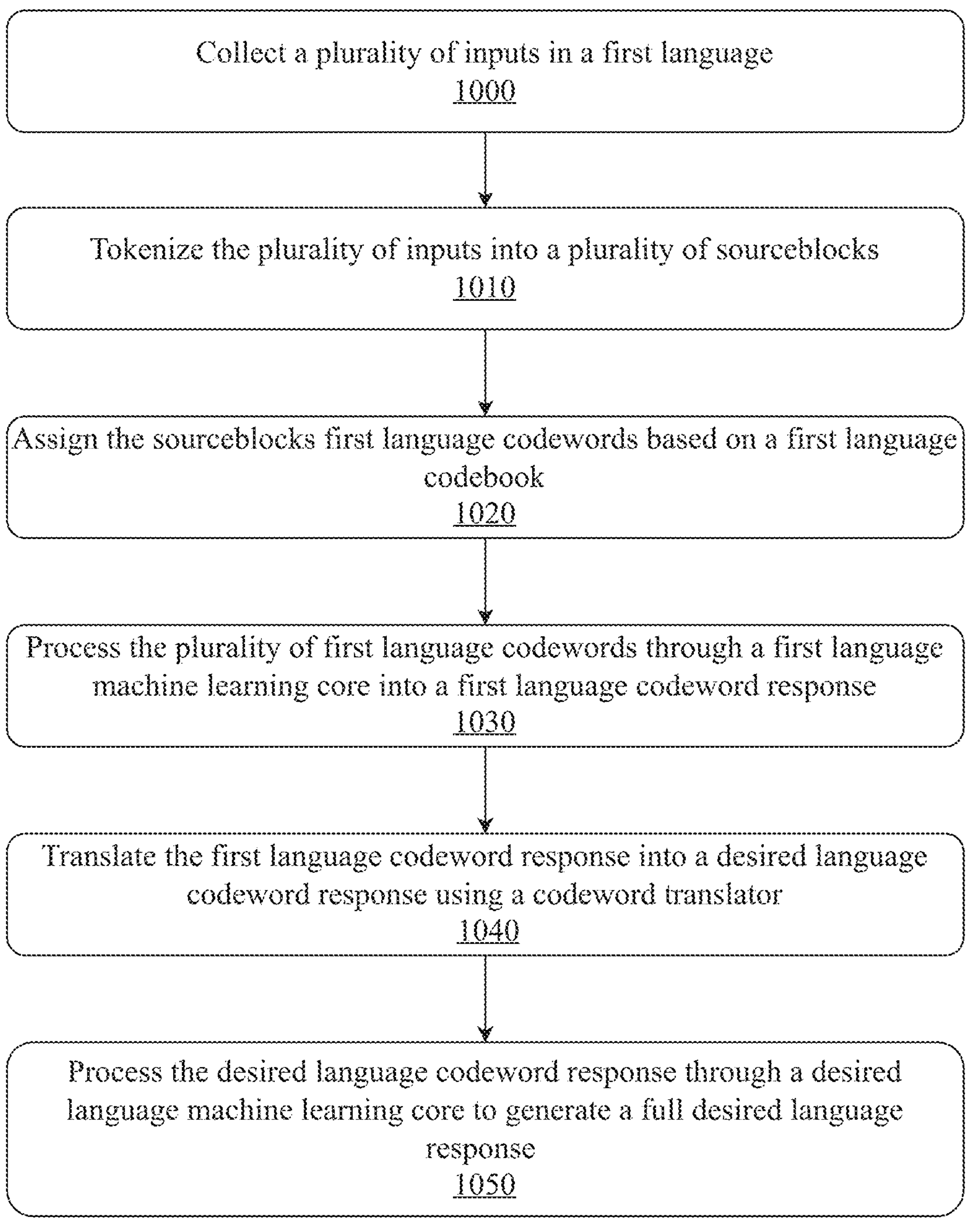
FIG. 10 is a flow diagram illustrating an exemplary method for language translation using a large codeword model for deep learning.

FIG. 10 is a flow diagram illustrating an exemplary method for language translation using a large codeword model for deep learning. In a first step 1000, collect a plurality of inputs in a first language. These inputs can be in various forms, such as text, speech, or any other language-based data. The first language represents the source language from which the translation will be performed.

In a step 1010, the collected inputs in the first language are tokenized into a plurality of sourceblocks. Tokenization is performed by the tokenizer component of the LCM architecture, which splits the input data into meaningful semantic units called sourceblocks. The tokenizer employs language-specific techniques to capture the linguistic structure and patterns of the first language. This may involve using subword tokenization methods like Byte-Pair Encoding (BPE) or WordPiece, or language-specific tokenization rules based on the grammatical and morphological properties of the first language.

In a step 1020, each sourceblock in the first language is assigned a codeword based on a first language codebook. The LCM architecture maintains a plurality of codebooks, each configured for a specific language. The first language codebook is a dictionary that maps sourceblocks in the first language to their corresponding codewords. Codewords are discrete, compressed representations of the sourceblocks, designed to capture the essential linguistic information in a compact form. The codeword assignment can be based on various techniques, such as frequency-based coding, hash functions, or learned mappings specific to the first language.

In a step 1030, the assigned first language codewords are then processed through a first language machine learning core. The first language machine learning core is a specialized component of the LCM architecture that is trained specifically on the first language. It learns to map input codeword sequences in the first language to output codeword sequences, capturing the linguistic patterns, relationships, and semantics of the first language. The first language machine learning core can be implemented using various configurations, such as a Transformer-based core, a Variational Autoencoder (VAE)-based core, or a combination of different architectures, tailored to the characteristics of the first language.

The first language machine learning core generates a first language codeword response. This response represents the output of the LCM in the first language, encoded as a sequence of codewords.

In a step 1040, a codeword translated is used to translate the first language codeword response into the desired language. The codeword translator is a component of the LCM architecture that maps codewords from the first language codebook to codewords in the desired language codebook. It learns the mappings between codewords across different languages, enabling cross-lingual translation. The codeword translator can be implemented using various techniques, such as neural machine translation models, cross-lingual word embeddings, or learned mapping functions.

The codeword translator converts the first language codeword response into a desired language codeword response. This response represents the translated output in the desired language, encoded as a sequence of codewords from the desired language codebook.

In a step 1050, the desired language codeword response is processed through a desired language machine learning core. The desired language machine learning core is another specialized component of the LCM architecture, trained specifically on the desired language. It learns to map input codeword sequences in the desired language to output sequences in the same language, capturing the linguistic patterns and semantics of the desired language. The desired language machine learning core generates a full desired language response which represents the final translated output in the desired language.

The method described provides a framework for using LCMs as translators between different languages. By maintaining language-specific codebooks and machine learning cores, the LCM can effectively capture the linguistic properties and nuances of each language. The codeword translator acts as a bridge between the different language representations, enabling cross-lingual translation. The modular nature of the LCM architecture allows for flexibility and scalability in handling multiple languages. New languages can be added by creating language-specific codebooks and training corresponding machine learning cores. The codeword translator can be extended to support translation between multiple language pairs, enabling a versatile and efficient translation system.

Figure 11:
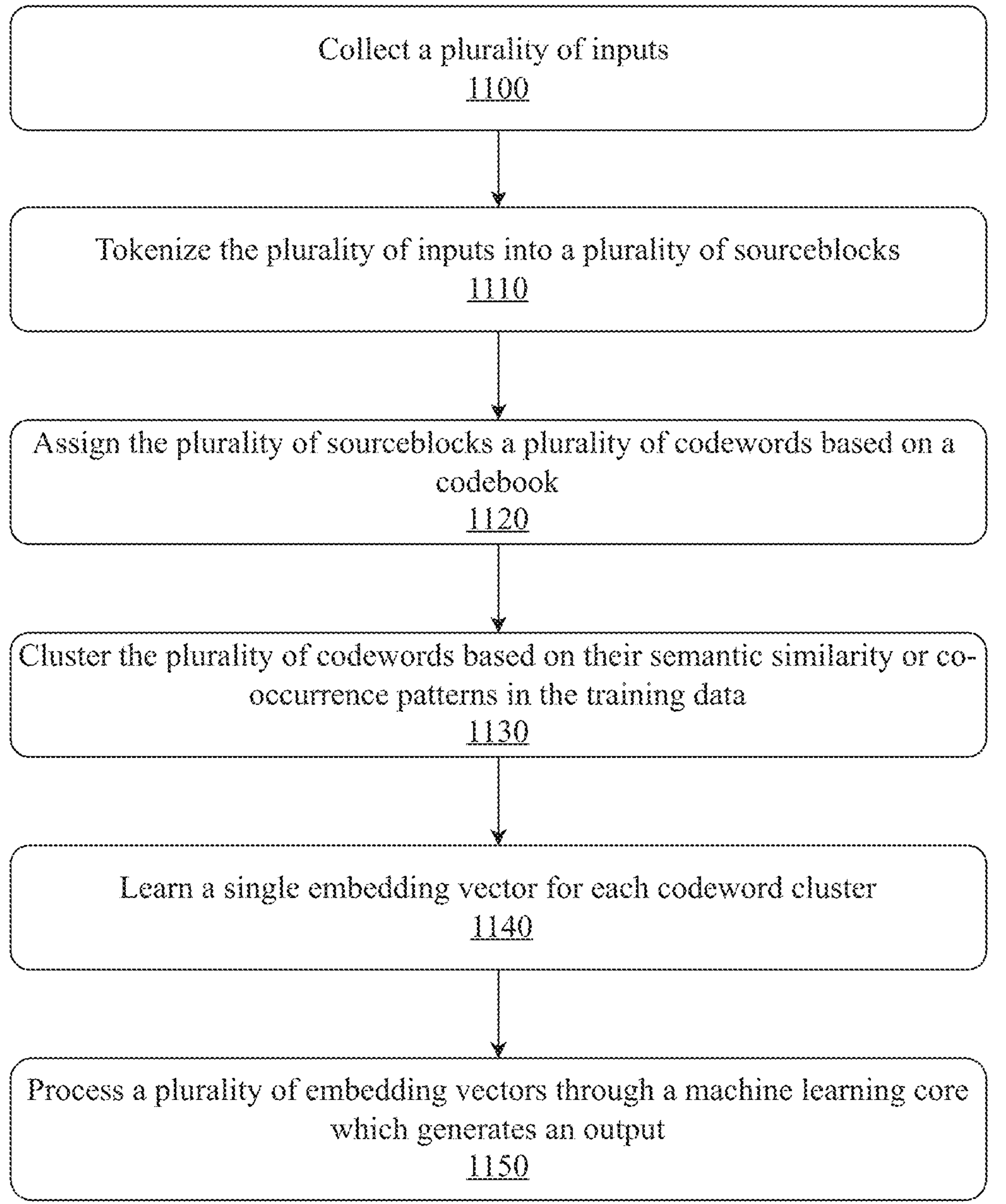
FIG. 11 is a flow diagram illustrating an exemplary method for codeword clustering using a large codeword model.

FIG. 11 is a flow diagram illustrating an exemplary method for codeword clustering using a large codeword model. In a step 1100, collect a plurality of inputs. These inputs can be from various sources and modalities, such as text, images, audio, time series, or any other structured or unstructured data. The inputs represent the data that needs to be processed by the LCM.

In a step 1110, the collected inputs are tokenized into a plurality of sourceblocks. Tokenization is performed by the tokenizer component of the LCM architecture, which splits the input data into meaningful semantic units called sourceblocks. The tokenizer employs techniques specific to each input modality to capture the relevant patterns and structures. For textual data, this may involve using subword tokenization methods like Byte-Pair Encoding (BPE) or WordPiece. For other modalities, such as images or audio, the tokenizer may use domain-specific techniques to extract relevant features or segments.

In a step 1120, each sourceblock is assigned a codeword based on a codebook. The codebook is a dictionary that maps sourceblocks to their corresponding codewords. Codewords are discrete, compressed representations of the sourceblocks, designed to capture the essential information in a compact form. The codeword assignment can be based on various techniques, such as frequency-based coding, hash functions, or learned mappings.

In a step 1130, the assigned codewords are then clustered based on their semantic similarity or co-occurrence patterns in the training data. Codeword clustering is a technique that groups semantically related or frequently co-occurring codewords together. This clustering process aims to capture the underlying semantic structure and relationships among the codewords. Various clustering algorithms can be employed, such as but not limited to k-means clustering, hierarchical clustering, or topic modeling techniques like Latent Dirichlet Allocation (LDA). The clustering algorithm takes into account the semantic similarity between codewords, which can be determined using measures like cosine similarity or semantic embeddings learned from the training data.

In a step 1140, a single embedding vector is learned for each codeword cluster. The embedding vector represents the shared semantic representation of the codewords within a cluster. By learning embeddings at the cluster level, the LCM can capture the high-level semantic concepts and relationships among the codewords. The embedding vectors are typically learned using techniques like word2vec, GloVe, or other embedding learning algorithms. These algorithms leverage the co-occurrence patterns and semantic similarities of the codewords within the clusters to learn dense, continuous vector representations.

In a step 1150, the learned embedding vectors for the codeword clusters are then processed through the machine learning core of the LCM. The machine learning core can be implemented using various architectures, such as a Transformer-based core, a Variational Autoencoder (VAE)-based core, or a combination of different models. The machine learning core takes the embedding vectors as input and learns to map them to the desired output. It captures the patterns, relationships, and semantics encoded in the embedding vectors to generate meaningful and coherent outputs. The machine learning core generates an output based on the processed embedding vectors. The output can be in the form of codewords, which are then mapped back to the corresponding sourceblocks or tokens using the codebook. Alternatively, the output can be directly generated in the target modality, such as text, images, or any other desired format, depending on the specific application.

The method described provides a framework for using an LCM with codeword clustering and learned embedding vectors. By clustering semantically similar or co-occurring codewords together and learning a single embedding vector for each cluster, the LCM can capture high-level semantic concepts and relationships among the codewords. This approach reduces the dimensionality of the embedding space and allows for more efficient processing and storage of the learned representations. Codeword clustering and embedding learning offer several advantages. It enables the LCM to capture semantic similarities and relationships among codewords, leading to more meaningful and coherent outputs. By learning embeddings at the cluster level, the LCM can generalize better to unseen or rare codewords, as they can be associated with the nearest cluster embedding. Additionally, the reduced dimensionality of the embedding space can lead to faster training and inference times, as well as lower memory requirements.

The specific implementation details, such as the choice of clustering algorithm, embedding learning technique, and machine learning core architecture, can be adapted based on the characteristics of the data and the desired output. The modular nature of the LCM architecture allows for flexibility in incorporating different clustering and embedding learning approaches. By leveraging codeword clustering and learned embedding vectors, the LCM can capture semantic relationships and generate more meaningful and coherent outputs. This approach has potential applications in various domains, such as natural language processing, information retrieval, and content generation, among others. It can lead to improved performance, generalization, and efficiency in processing and generating data using LCMs.

Figure 12:
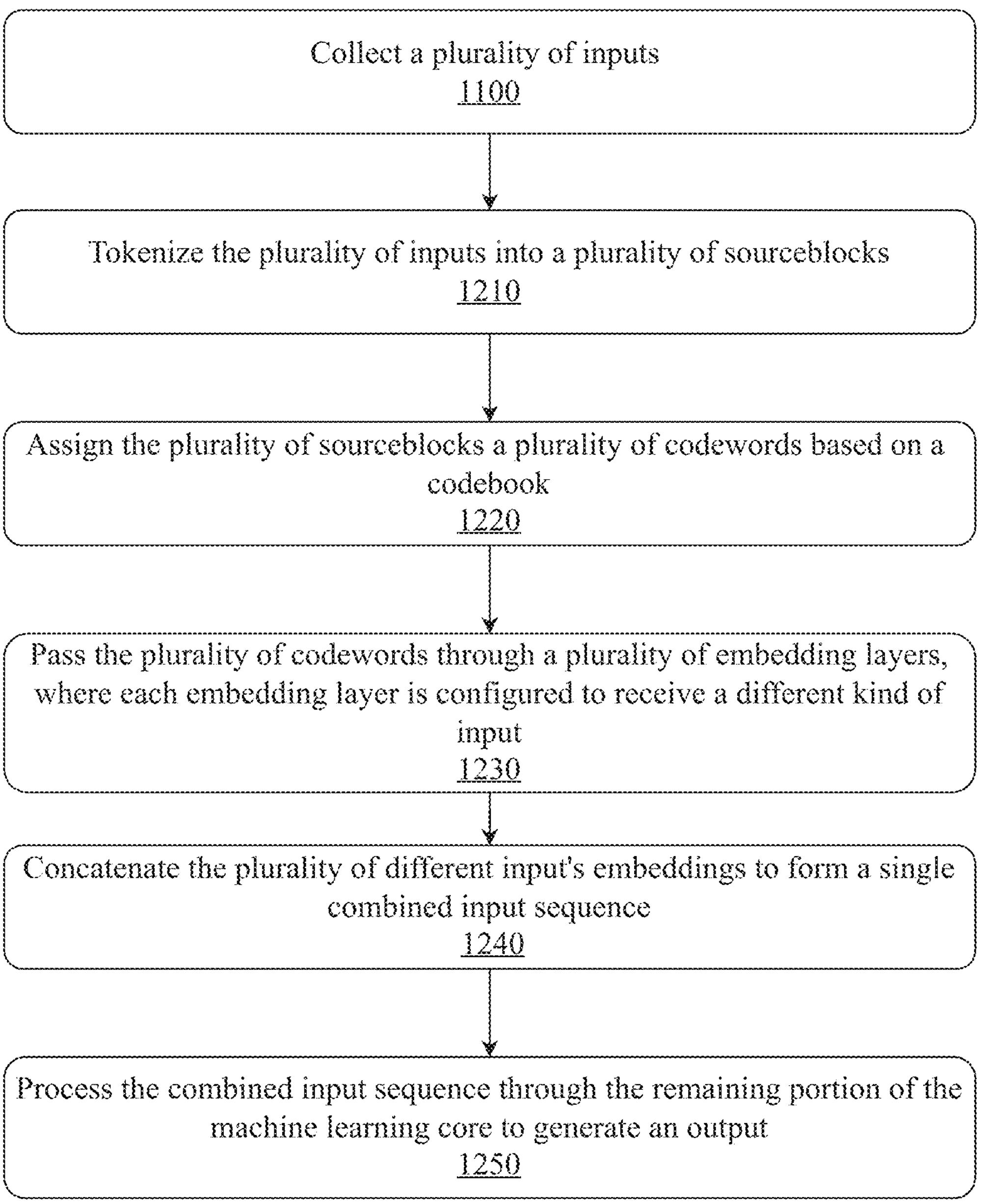
FIG. 12 is a flow diagram illustrating an exemplary method for a large codeword model for deep learning using a dual embedding layer.

FIG. 12 is a flow diagram illustrating an exemplary method for a large codeword model for deep learning using a dual embedding layer. In a first step 1200, collect a plurality of inputs. These inputs can be from various sources and modalities, such as text, images, audio, time series, or any other structured or unstructured data. The inputs represent the data that needs to be processed by the LCM.

In a step 1210, the collected inputs are tokenized into a plurality of sourceblocks. Tokenization is performed by the tokenizer component of the LCM architecture, which splits the input data into meaningful semantic units called sourceblocks. The tokenizer employs techniques specific to each input modality to capture the relevant patterns and structures. For textual data, this may involve using subword tokenization methods like Byte-Pair Encoding (BPE) or WordPiece. For other modalities, such as images or audio, the tokenizer may use domain-specific techniques to extract relevant features or segments.

In a step 1220, each sourceblock is assigned a codeword based on a codebook. The codebook is a dictionary that maps sourceblocks to their corresponding codewords. Codewords are discrete, compressed representations of the sourceblocks, designed to capture the essential information in a compact form. The codeword assignment can be based on various techniques, such as frequency-based coding, hash functions, or learned mappings.

In a step 1230, the assigned codewords are then passed through a plurality of embedding layers. Unlike traditional transformer architectures that use a single embedding layer, this modified LCM architecture employs multiple embedding layers, each configured to receive a different kind of input. Each embedding layer learns a dense vector representation specific to its corresponding input modality. For example, there can be separate embedding layers for text, images, audio, and other input types. The embedding layers capture the semantic and structural information of the input codewords in a continuous vector space.

In a step 1240, the embeddings from the different input modalities are then concatenated to form a single combined input sequence. This concatenation process brings together the learned representations from each embedding layer, creating a unified representation that captures the information from all input modalities. The combined input sequence represents a multi-modal representation of the input data.

In a step 1250, the combined input sequence is then processed through the remaining portion of the machine learning core. This remaining portion can include various components, such as self-attention mechanisms, feedforward layers, and output layers, depending on the specific architecture of the LCM. The machine learning core learns to map the combined input sequence to the desired output, capturing the relationships and interactions between the different input modalities.

In a step 1250, the machine learning core generates an output based on the processed combined input sequence. The output can be in the form of codewords, which are then mapped back to the corresponding sourceblocks or tokens using the codebook. Alternatively, the output can be directly generated in the target modality, such as text, images, or any other desired format, depending on the specific application.

The method provides a framework for using a modified LCM architecture with multiple embedding layers to handle diverse input modalities. By employing separate embedding layers for each input type, the LCM can learn specialized representations that capture the unique characteristics and patterns of each modality. The concatenation of these embeddings allows for a unified processing of the multi-modal input, enabling the LCM to learn and generate outputs that leverage the combined information from all input sources.

The specific implementation details of the embedding layers and the remaining portion of the machine learning core can be adapted based on the requirements of the application and the characteristics of the input data. The modular nature of this modified LCM architecture allows for customization and extension to incorporate additional input modalities or processing components as needed.

By leveraging the power of multiple embedding layers and the combined processing of multi-modal inputs, this modified LCM architecture opens up new possibilities for building deep learning models that can handle diverse data types and generate rich, multi-modal outputs. It has potential applications in various domains, such as multimedia content generation, cross-modal retrieval, and multi-modal reasoning, among others.

Figure 13:
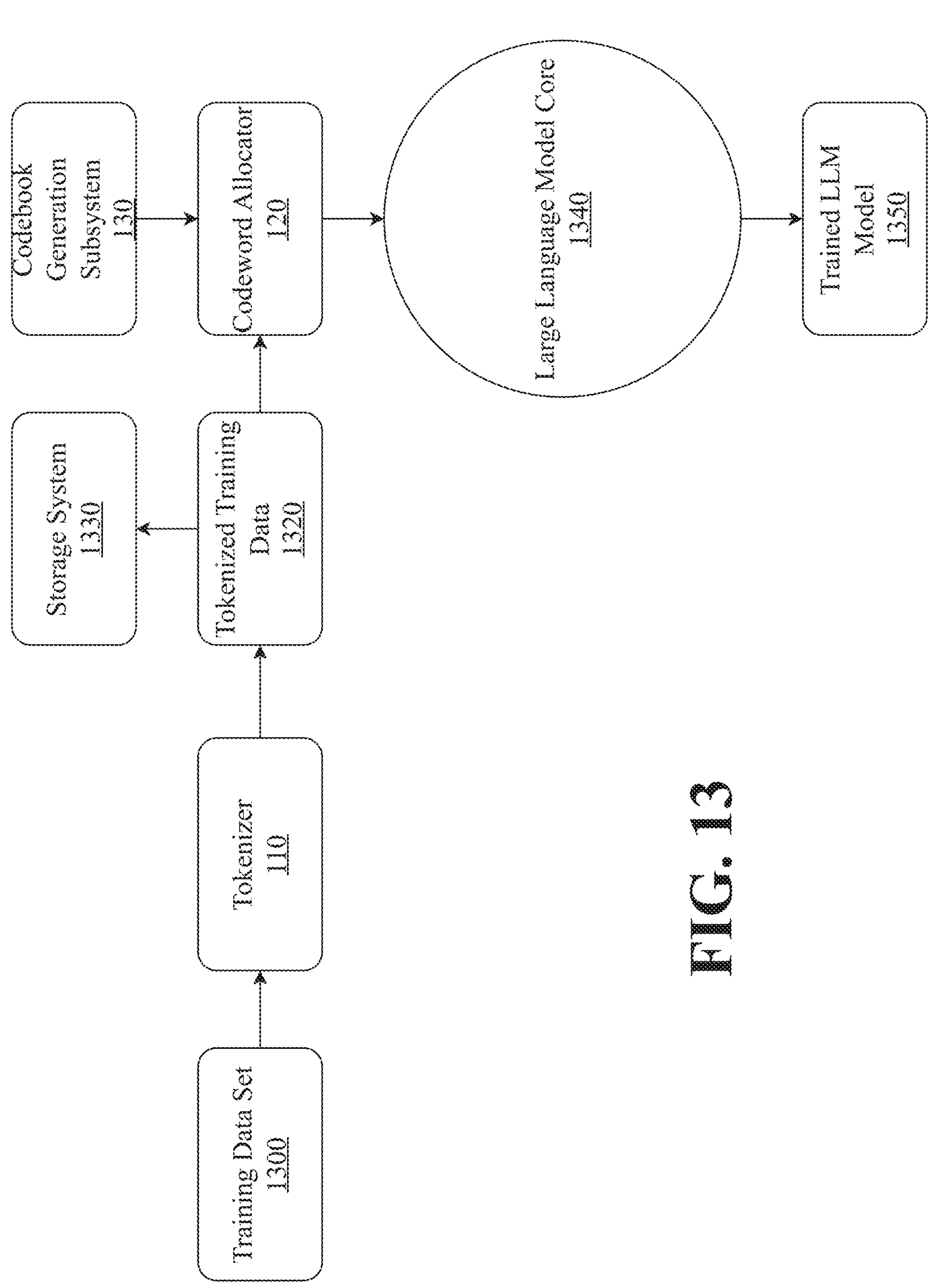
FIG. 13 is a block diagram illustrating an embodiment of a system for training Large Language Models using codewords.

FIG. 13 is a block diagram illustrating an embodiment of a system for training Large Language Models using codewords. Illustrated is a comprehensive training system for a Large Codeword Model (LCM), incorporating a codeword-based approach to enhance the efficiency of training Large Language Models (LLMs). This system aims to significantly reduce the overall costs of training and operating LLMs by approximately, representing a substantial improvement in the field of deep learning and natural language processing.

The system begins with a diverse and extensive training data set 1300. This dataset comprises a wide range of text-based information, potentially including books, articles, websites, and other textual sources. For example, it might contain millions of sentences from various domains such as literature, science, news, and social media, providing a broad basis for language understanding.

This rich dataset is fed into a sophisticated tokenizer 110. The tokenizer's role is to break down the input text into meaningful semantic units called sourceblocks. It employs advanced techniques such as but not limited to subword tokenization methods like Byte-Pair Encoding (BPE) or WordPiece. These methods are particularly effective in capturing the linguistic structure and patterns within the training data, even for languages with complex morphology or for handling rare words and neologisms. For instance, using BPE, a word like "unfriendly" might be broken down into "un", "friend", and "ly". This approach allows the model to understand the components of words and their relationships, enabling better generalization to unseen words. The output of the tokenizer is a set of tokenized training data 1320. This intermediate step represents the raw text converted into a sequence of tokens, each capturing a semantic unit of the original text.

Next, this tokenized data is processed by the codebook generation subsystem 130, a component in the codeword-based approach. This subsystem performs several important tasks. It first analyzes the frequency of each token in the entire dataset. Based on these frequencies, it constructs a Huffman tree. In a Huffman tree, more frequent tokens are closer to the root, allowing them to be represented by shorter codes. Using this tree, the subsystem generates a codebook—a dictionary that maps each token to a unique codeword. For example, if "the" is the most common token, it might be assigned a very short codeword like "00". A less common word like "quick" might get a longer codeword like "1101".

The codeword allocator 120 then takes over, using the tokenized training data and the generated codebook to convert each token into its corresponding codeword. This step effectively compresses the training data, representing it in a more compact form while preserving its semantic content. This compressed, codeword-based representation of the training data is then fed into the large language model core 1340 for training. This core implements the machine learning architecture, which could be based on transformers, variational autoencoders, or recurrent neural networks, as described in FIG. 3 and FIG. 4.

After training, an LLM now processes codewords instead of traditional tokens. This change allows for several potential benefits. First, shorter codewords for common tokens can lead to faster processing. Second, the compact representation means more data can fit in memory at once. Third, the fixed-length nature of codewords might allow for more efficient parallel processing.

As the original textual and tokenized data are converted to codewords, the uncompressed versions can be removed or transferred to long-term storage 1330. This frees up valuable computational resources and further contributes to the efficiency of the system. The storage system might keep a small sample of the original data for validation purposes, but the bulk of the training would proceed using only the codeword representations.

The result of this training process is a trained LLM 1350 that operates on codewords. This model can then be used for various language tasks with improved efficiency compared to traditional token-based models. When deployed, this model may work in tandem with systems at the edge (like user devices) that handle the conversion between human-readable text and codewords, allowing for efficient transmission and processing of language data.

This codeword-based training approach leverages the strengths of the original LCM architecture while introducing a more compact data representation. By training directly on codewords, the system can reduce computational requirements and memory usage, leading to a reduction in overall training and operational costs. The synergy between these components from the initial tokenization, through the clever codeword allocation, to the efficient model training-creates a system that maintains the powerful language understanding capabilities of large language models while significantly improving their efficiency. This system makes advanced language AI more accessible and cost-effective, opening up new possibilities for its application across various domains.

Figure 14:
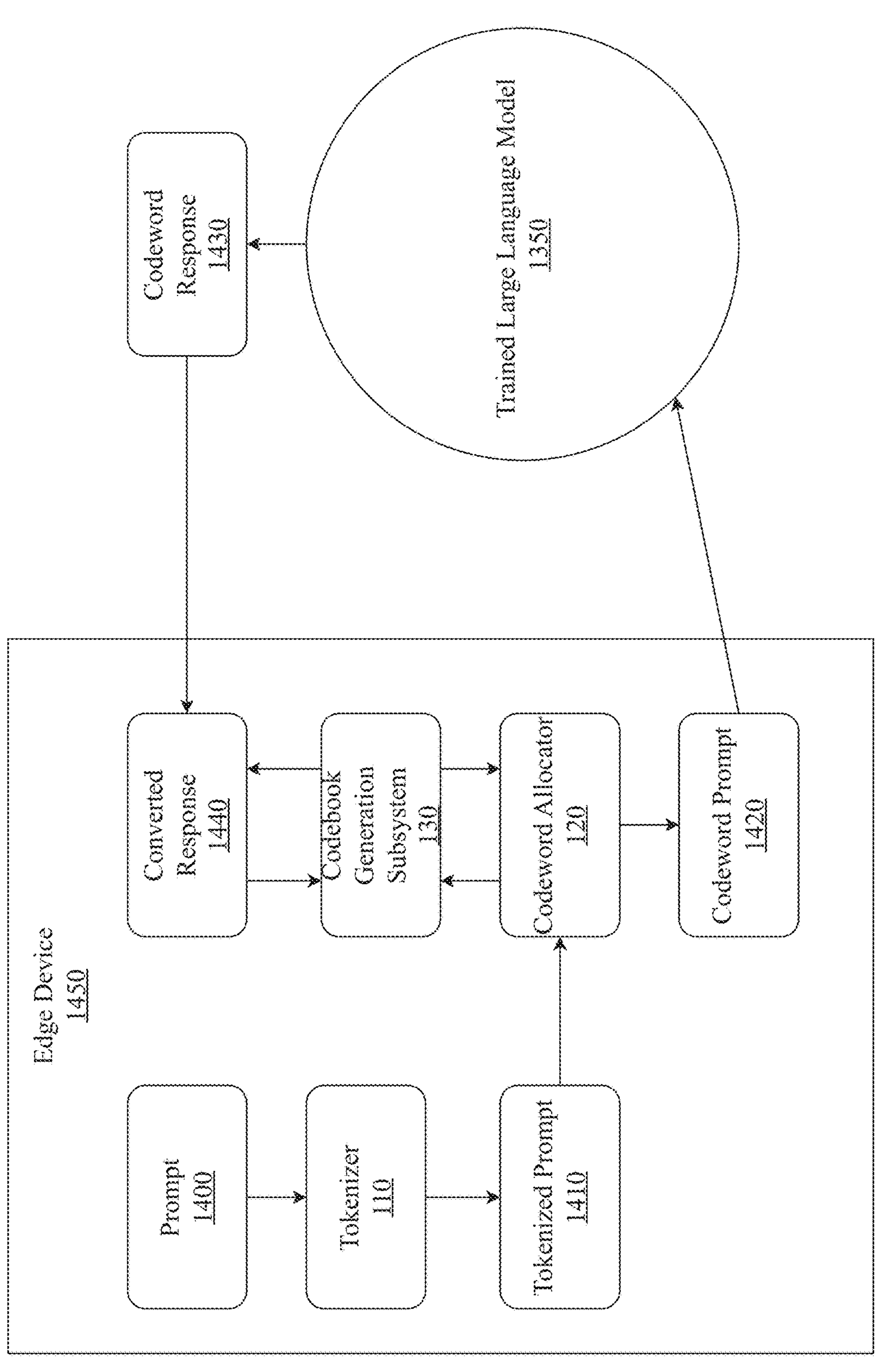
FIG. 14 is a block diagram illustrating an embodiment of a system for processing prompts on an edge device and converting Large Language Model codeword responses on an edge device.

FIG. 14 is a block diagram illustrating an embodiment of a system for processing prompts on an edge device and converting Large Language Model codeword responses on an edge device. Depicted is an operational workflow of a trained Large Language Model (LLM), showcasing how it efficiently processes language tasks using a codeword-based approach. This method significantly enhances the performance and reduces the operational costs of Large Language Models, representing a major advancement in practical AI applications.

The process begins with a prompt 1400 generated by a user on an edge device 1450. An edge device could be any user-end hardware capable of running lightweight operations, such as smartphones, tablets, personal computers, or IoT devices. For instance, a user might type the question "What is the capital of France?" into a chat interface on their smartphone.

This prompt is first processed by a tokenizer 110 located on the edge device. The tokenizer breaks down the input text into meaningful semantic units or tokens. It employs sophisticated techniques like Byte-Pair Encoding (BPE) or WordPiece to effectively capture the linguistic nuances of the input. For the example, the tokenizer might break down the prompt into: ["What", "is", "the", "capital", "of", "France", "?"].

The output of this step is a tokenized prompt 1410, which represents the user's input as a sequence of tokens. This tokenization step, performed on the edge device, helps to standardize the input and prepare it for further processing.

Next, the tokenized prompt interacts with the codebook generation subsystem 130 and the codeword allocator 120. In the operational phase, the codebook generation subsystem 130 doesn't create a new codebook for each prompt. Instead, it references a pre-established codebook that was created during the training phase. This codebook is a compact dictionary mapping tokens to codewords, which is small enough to be stored and quickly accessed on the edge device.

The codeword allocator 120 uses this codebook to convert each token in the tokenized prompt into its corresponding codeword. This conversion process is a simple and fast lookup operation, ideal for execution on edge devices with limited computational resources. For the capital of France example, the tokenized prompt might be converted into a sequence of codewords like: [1101, 00, 01, 10110, 10, 11100, 1111]. The result of this process is a codeword prompt 1420, which is a highly compressed representation of the user's original input. This codeword prompt is what gets sent from the edge device to the server hosting the trained large language model 1350.

The trained large language model 1350 processes the codeword prompt. This model is optimized to work directly with codewords rather than traditional tokens. It leverages advanced architectures like transformers, variational auto-encoders, or recurrent neural networks, as described FIG. 3 and FIG. 4, but operates on the more efficient codeword representations.

After processing, the model generates a codeword response 1430. This is a sequence of codewords representing the model's answer to the user's prompt. For our example, it might be a sequence representing "The capital of France is Paris."

This codeword response is then sent back to the edge device 1450. The edge device uses the same codebook to convert the codewords back into tokens where the tokens are then combined to form the final text response. The result is a converted response 1440, which is the human-readable answer displayed to the user on their device. This entire process—from user input to displayed response—happens quickly and efficiently, leveraging the power of the codeword-based LLM while minimizing data transfer and computational load on the edge device.

The synergy between the edge device and the central LLM, mediated by the codeword system, creates a highly efficient and responsive system. It maintains the powerful language understanding capabilities of large language models while significantly improving their operational efficiency and reducing latency. This system makes advanced language AI more accessible and responsive in real-world applications, from virtual assistants and chatbots to language translation services and beyond.

By offloading certain operations to the edge device and using the compact codeword representation, this system can achieve a substantial reduction in operational costs compared to traditional token-based models, while potentially improving response times and reducing network load. This approach opens up new possibilities for deploying sophisticated language AI in a wide range of scenarios, including those with limited network connectivity or on devices with constrained resources.

Figure 15:
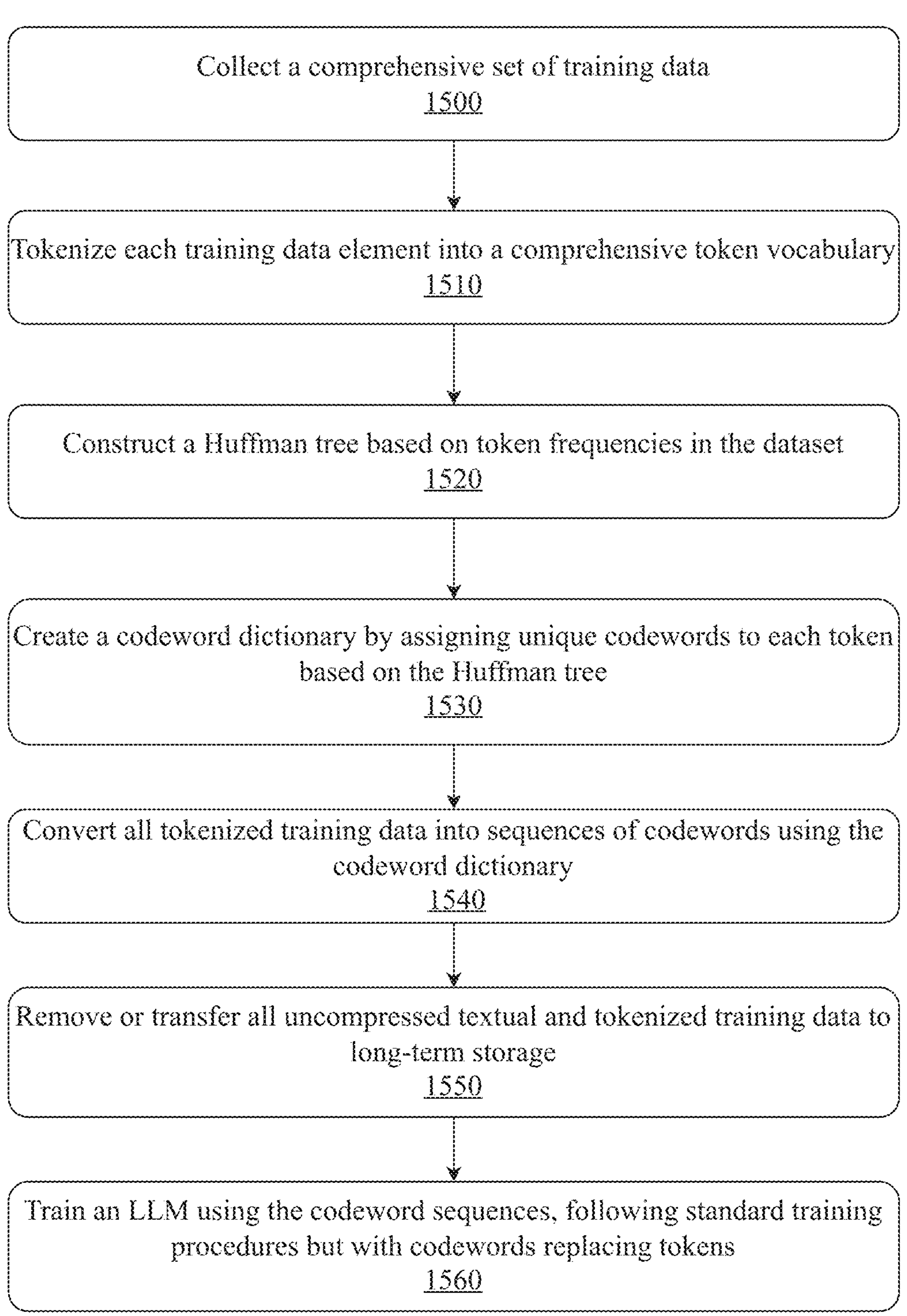
FIG. 15 is a flow diagram illustrating an exemplary method for training Large Language Models using codewords.

FIG. 15 is a flow diagram illustrating an exemplary method for training Large Language Models using codewords. In a first step 1500, a comprehensive set of training data is collected. This step involves gathering a diverse and extensive corpus of text-based information from various sources. The training data may include books, articles, websites, social media posts, and other textual content, covering a wide range of topics, styles, and languages. The goal is to create a dataset that represents the breadth and depth of language use, enabling the LLM to develop a robust understanding of language patterns and semantics.

In a step 1510, each training data element is tokenized to build a comprehensive token vocabulary. This step employs advanced tokenization techniques, such as Byte-Pair Encoding (BPE) or WordPiece, to break down the text into meaningful semantic units or tokens. The tokenization process identifies common subwords, handles rare words effectively, and creates a vocabulary that balances coverage and efficiency. For example, the word "unfriendable" might be broken down into tokens like ["un", "friend", "able"]. This step results in a complete inventory of all unique tokens present in the training data.

In a step 1520, a Huffman tree is constructed based on token frequencies in the dataset. This step involves calculating the frequency of each token in the entire training corpus and using this information to build a Huffman tree. In this tree structure, more frequent tokens are positioned closer to the root, while less frequent tokens are placed deeper in the tree. This arrangement forms the basis for efficient codeword assignment in the next step.

In a step 1530, a codeword dictionary is created by assigning unique codewords to each token based on the Huffman tree. Each token is given a unique binary code, with more frequent tokens receiving shorter codes and less frequent tokens receiving longer codes. For instance, a common word like "the" might be assigned a short code like "00", while a rare word might receive a longer code like "1101011". This step results in a complete mapping between tokens and their corresponding codewords, optimizing for both compression and quick lookup.

In a step 1540, all tokenized training data is converted into sequences of codewords using the codeword dictionary. This step transforms the entire training corpus from sequences of tokens into sequences of codewords. For example, the sentence "The cat sat on the mat" might be converted to a codeword sequence like [00, 1101, 10110, 1111, 00, 10111]. This conversion significantly reduces the storage space required for the training data while preserving all necessary information for the LLM training process.

In a step 1550, all uncompressed textual and tokenized training data is removed or transferred to long-term storage. This step is for freeing up valuable computational resources. The original text and token-based representations, which are no longer needed for the immediate training process, are either deleted or moved to archival storage. This action significantly reduces the memory footprint of the training data, allowing for more efficient use of high-speed storage and memory during the training process.

In a step 1560, an LLM is trained using the codeword sequences, following standard training procedures but with codewords replacing tokens. This step involves feeding the codeword sequences into the chosen LLM architecture (such as a Transformer-based model) and training it using techniques like masked language modeling or next token prediction. The key difference is that the model learns to predict and generate codewords rather than tokens. This codeword-based training allows the model to operate more efficiently, potentially enabling faster training times and reduced computational requirements while maintaining the model's language understanding capabilities.

Figure 16:
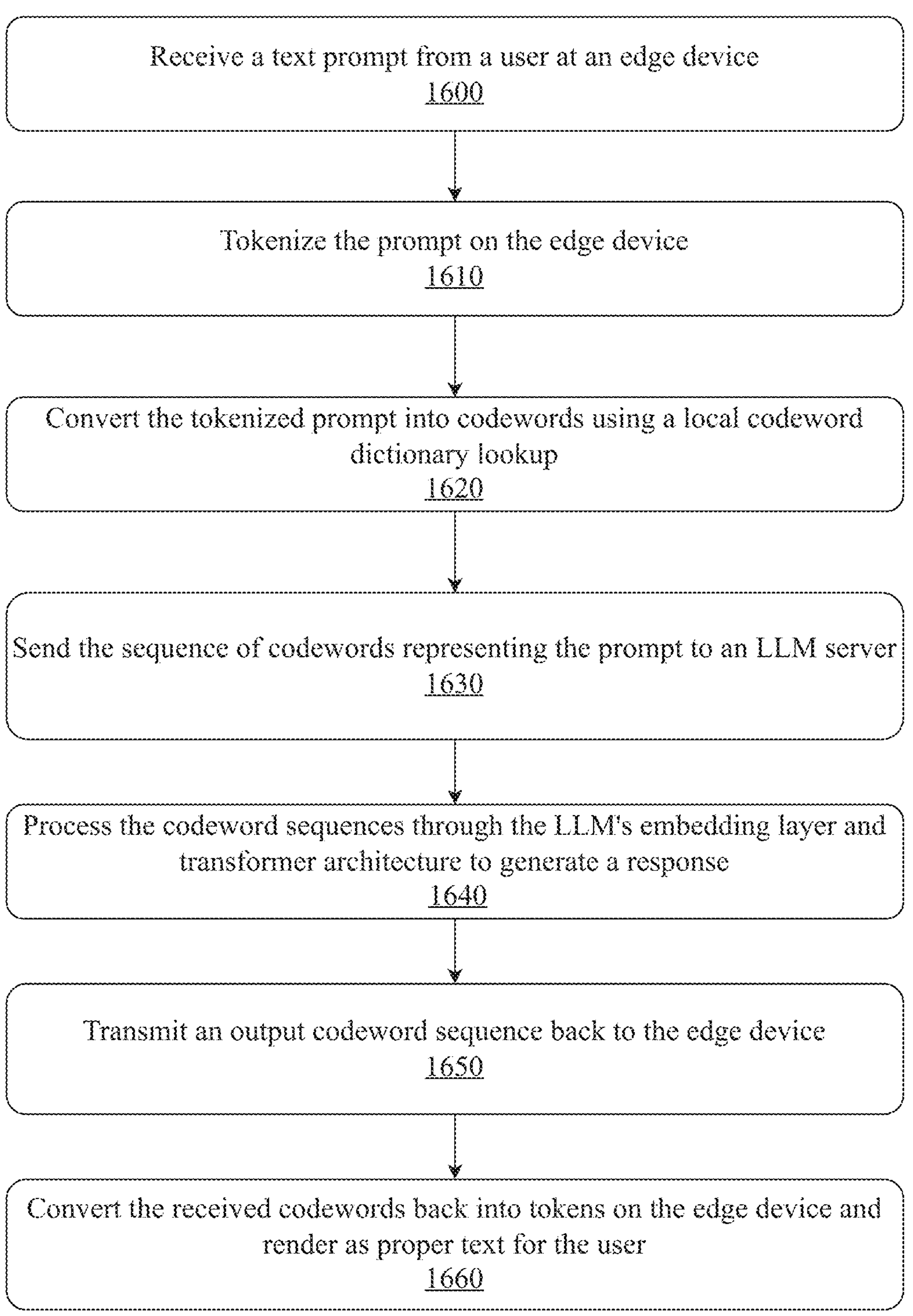
FIG. 16 is a flow diagram illustrating an exemplary method for processing prompts on an edge device and converting Large Language Model codeword responses on an edge device.

FIG. 16 is a flow diagram illustrating an exemplary method for processing prompts on an edge device and converting Large Language Model codeword responses on an edge device. This method demonstrates how the system efficiently processes user queries and generates responses, leveraging both edge devices and a central LLM server. In a first step 1600, a text prompt is received from a user at an edge device. This step involves the user interacting with an application or interface on their local device, such as a smartphone, tablet, or computer. For example, a user might type the question "What is the weather like today?" into a chatbot interface on their phone. The edge device captures this textual input, preparing it for further processing.

In a step 1610, the prompt is tokenized on the edge device. This step employs a lightweight tokenization algorithm, likely using the same approach (such as Byte-Pair Encoding or WordPiece) that was used during the LLM's training. The tokenizer breaks down the user's input into individual semantic units or tokens. For example, the prompt might be tokenized into ["What", "is", "the", "weather", "like", "today", "?"]. This tokenization process standardizes the input and prepares it for the subsequent codeword conversion.

In a step 1620, the tokenized prompt is converted into codewords using a local codeword dictionary lookup. This step involves referencing a pre-loaded, compact codeword dictionary stored on the edge device. This dictionary, created during the LLM's training phase, maps tokens to their corresponding codewords. The edge device performs a simple lookup operation for each token, converting it to its assigned codeword. The example might become a sequence like [1101, 00, 01, 10110, 1111, 11100, 10]. This conversion process is computationally lightweight, making it suitable for execution on devices with limited resources.

In a step 1630, the sequence of codewords representing the prompt is sent to an LLM server. This step involves transmitting the compact codeword sequence over the network to the server hosting the trained LLM. The use of codewords significantly reduces the amount of data being transmitted compared to sending raw text or tokens, potentially improving response times and reducing bandwidth usage.

In a step 1640, the codeword sequence is processed through the LLM's embedding layer and transformer architecture to generate a response. On the server, the LLM-which has been trained to work directly with codewords-takes the input codeword sequence and processes it through its neural network architecture. This typically involves embedding the codewords, passing them through multiple layers of a transformer model, and generating an output sequence of codewords representing the model's response. The LLM understands and generates language entirely in the codeword domain, which allows for efficient processing.

In a step 1650, an output codeword sequence is transmitted back to the edge device. The LLM's response, still in the form of codewords, is sent back over the network to the user's edge device. Again, this transmission benefits from the compact nature of codewords, potentially reducing latency and bandwidth usage.

In a step 1660, the received codewords are converted back into tokens on the edge device and rendered as proper text for the user. This final step involves the edge device using its local codeword dictionary to convert the received codewords back into tokens and combining the tokens which can be rendered as human-readable text. For the weather example, the edge device might convert a received codeword sequence back into tokens, and then render the final response: "The weather today is sunny with a high of 75° F."

This method showcases the synergy between edge computing and centralized LLM processing, mediated by the efficient codeword system. By distributing the workload—with tokenization and codeword conversion happening on the edge, and the core language processing occurring on the central server—the system can achieve high efficiency and responsiveness. The use of codewords throughout the process contributes to reduced data transfer, improved processing speed, and potentially enhanced privacy, as the raw text is never transmitted over the network.

This approach enables the deployment of powerful language AI capabilities even on devices with limited computational resources or in scenarios with constrained network connectivity. The result is a system that can provide sophisticated language understanding and generation capabilities with improved efficiency, contributing to a reduction in operational costs compared to traditional token-based LLM systems.

Exemplary Computing Environment

Figure 23:
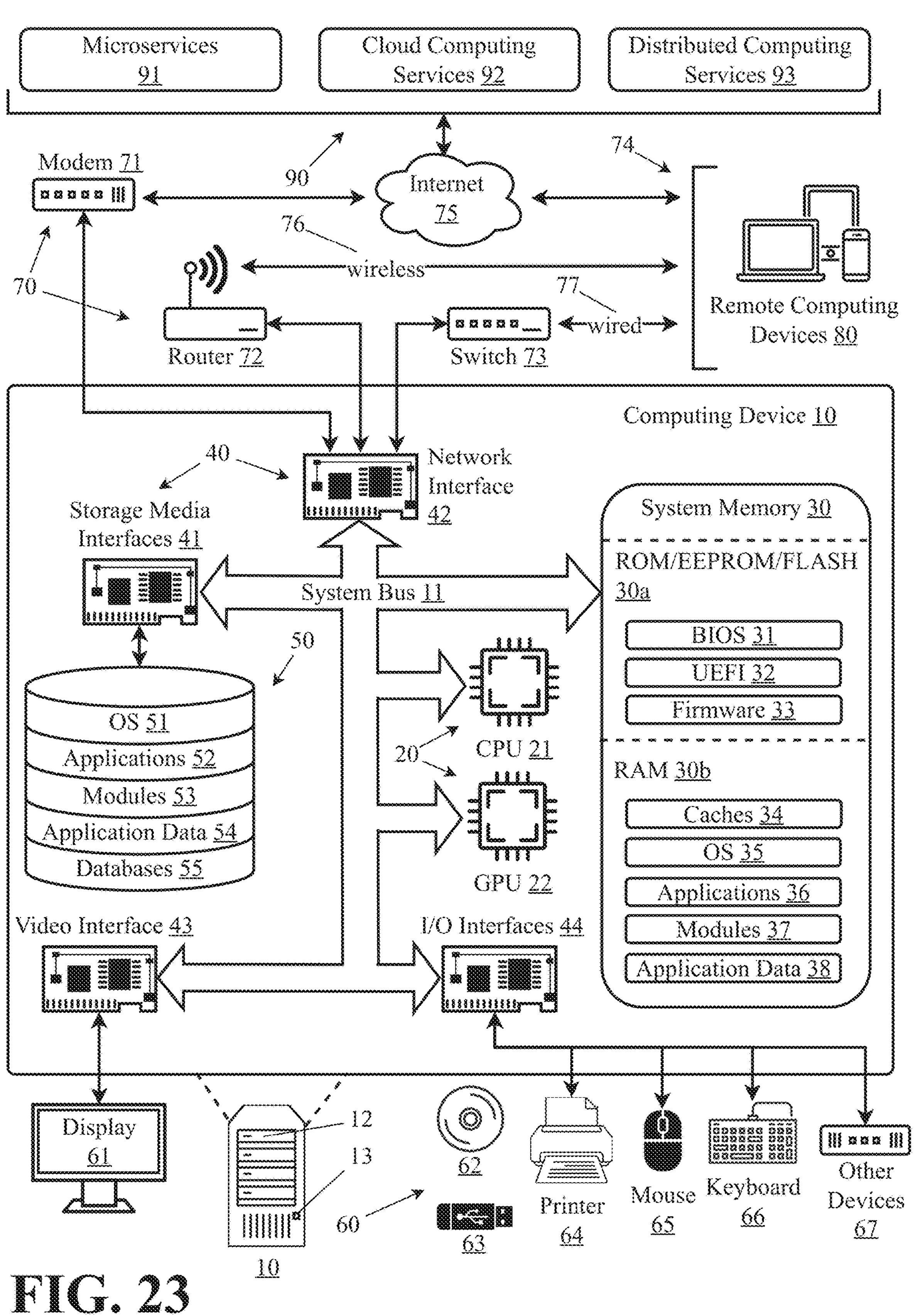
FIG. 23 illustrates an exemplary computing environment on which an embodiment described herein may be implemented.

FIG. 23 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory **30*a* is not erased when power to the memory is removed, and includes memory types such as read only memory (ROM), electronically-erasable programmable memory (EEPROM), and rewritable solid state memory (commonly known as "flash memory"). Non-volatile memory 30***a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

APPENDIX A

SAMPLE PYTORCH PSEUDOCODE FOR A LARGE CODEWORD MODEL WITH A CODEBOOK

```
import torch
import torch.nn as nn
from torch.utils.data import Dataset, DataLoader
from transformers import GPT2Tokenizer, GPT2LMHeadModel
# Building a large codebook
def build__codebook(text__data):
  tokenizer = GPT2Tokenizer.from__pretrained('gpt2')
  tokens = tokenizer.encode(text__data)
  unique__tokens = sorted(set(tokens))
  codebook = {token: idx for idx, token in enumerate(unique__tokens)}
  return codebook
# Encoding text to codewords
def encode__text(text, codebook):
  tokenizer = GPT2Tokenizer.from__pretrained('gpt2')
  tokens = tokenizer.encode(text)
  codewords = [codebook[token] for token in tokens]
  return codewords
# Decoding codewords to text
def decode__codewords(codewords, codebook):
  tokenizer = GPT2Tokenizer.from__pretrained('gpt2')
  tokens = [list(codebook.keys( ))[list(codebook.values( )).index(codeword)] for codeword in
codewords]
  text = tokenizer.decode(tokens)
  return text
# Dataset class for codeword sequences
class CodewordDataset(Dataset):
  def ___init___(self, codeword__sequences):
    self.codeword__sequences = codeword__sequences
  def ___len___(self):
    return len(self.codeword__sequences)
  def ___getitem___(self, idx):
    return torch.tensor(self.codeword__sequences[idx])
# Training the large codebook model
def train__model(codeword__sequences, codebook__size, num__epochs, batch__size, learning__rate):
  dataset = CodewordDataset(codeword__sequences)
  dataloader = DataLoader(dataset, batch__size=batch__size, shuffle=True)
  model = GPT2LMHeadModel.from__pretrained('gpt2')
  model.resize__token__embeddings(codebook__size)
  optimizer = torch.optim.Adam(model.parameters( ), lr-learning__rate)
  criterion = nn.CrossEntropyLoss( )
  for epoch in range(num__epochs):
    for batch in dataloader:
      inputs = batch[:, :-1]
      targets = batch[:, 1:]
      outputs = model(inputs)
      loss = criterion(outputs.view(-1, codebook__size), targets.view(-1))
      optimizer.zero__grad( )
      loss.backward( )
      optimizer.step( )
    print(f'Epoch [{epoch+1}/{num__epochs}], Loss: {loss.item( ):.4f}')
  return model
# Generating responses using the trained model
def generate__response(prompt, model, codebook, max__length):
  codewords = encode__text(prompt, codebook)
  input__tensor = torch.tensor(codewords).unsqueeze(0)
```

APPENDIX A-continued

SAMPLE PYTORCH PSEUDOCODE FOR A LARGE CODEWORD MODEL WITH A CODEBOOK

```
  with torch.no_grad( ):
    output = model.generate(input_tensor, max_length=max_length, num_return_sequences=1)
  generated_codewords = output[0].tolist( )
  generated_text = decode_codewords(generated_codewords, codebook)
  return generated_text
# Example usage
text data = "Your training data goes here..."
codebook = build_codebook(text_data)
codeword_sequences = [encode_text(text, codebook) for text in text_data.split('\n')]
model = train_model(codeword_sequences, len(codebook), num_epochs=10, batch_size=16,
learning_rate=1e-4)
prompt = "User prompt goes here..."
generated_response = generate_response(prompt, model, codebook, max_length=100)
print(generated_response)
```

APPENDIX B

SAMPLE PYTORCH PSEUDOCODE FOR A LARGE CODEWORD MODEL TRANSLATOR

```
import torch
import torch.nn as nn
class CodewordTranslator(nn.Module):
  def __init__(self, input_size, hidden_size, output_size):
    super(CodewordTranslator, self).__init__( )
    self.encoder = nn.LSTM(input_size, hidden_size, batch_first=True)
    self.decoder = nn.LSTM(hidden_size, output_size, batch_first=True)
    self.attention = nn.Linear(hidden_size + output_size, output_size)
    self.softmax = nn.Softmax(dim=2)
  def forward(self, input_seq, target_seq):
    _, (hidden, cell) = self.encoder(input_seq)
    decoder_outputs = [ ]
    for t in range(target_seq.size(1)):
      decoder_input = target_seq[:, t].unsqueeze(1)
      decoder_output, (hidden, cell) = self.decoder(decoder_input, (hidden, cell))
      attention_weights = self.softmax(self.attention(torch.cat((decoder_output,
hidden.squeeze(0)), dim=1)))
      context_vector = torch.bmm(attention_weights.unsqueeze(1), input_seq)
      decoder_output = decoder_output + context_vector
      decoder_outputs.append(decoder_output)
    decoder_outputs = torch.cat(decoder_outputs, dim=1)
    return decoder_outputs
```

What is claimed is:

1. A computer system configured to execute software instructions stored on nontransitory machine-readable storage media, wherein the software instructions comprise instructions that:

tokenize a set of training data into a plurality of training tokens;

create a codeword dictionary by assigning unique codewords to each of the plurality of training tokens;

convert all training tokens into a plurality of training codewords using the codeword dictionary;

train a large codeword model using the plurality of training codewords;

receive a plurality of prompt codewords;

process the plurality of prompt codewords through the large codeword model to generate a plurality of thought codewords representing intermediate reasoning steps; and process the sequence of prompt codewords together with the plurality of thought codewords through the large codeword model to generate a codeword response.

2. The computer system of claim 1, wherein the large codeword model uses a latent transformer architecture.

3. The computer system of claim 1, wherein conversion between tokens and codewords for a user prompt is performed on an edge device using a local codeword dictionary lookup, and only codewords are transmitted to the large codeword model.

4. The computer system of claim 1, further comprising a plurality of language-specific codebooks and a codeword translator configured to map codewords between different language codebooks.

5. The computer system of claim 1, wherein the large codeword model includes a codeword clustering module that groups semantically related codewords and learns a single embedding per cluster.

6. The computer system of claim 1, wherein the model comprises multiple embedding layers respectively configured for different input modalities and a concatenation stage that forms a unified sequence for transformer processing.

7. The computer system of claim 1, further comprising a thought association layer configured to (i) segment the prompt into semantic portions, (ii) associate each thought codeword with at least one segment, and (iii) compute a relevance score for each association.

8. The computer system of claim 1, wherein a thought cache stores thought codewords together with (a) a reasoning-chain index recording prerequisite, supporting, or contradictory relationships among thoughts, and (b) cross-references enabling retrieval of complete reasoning sequences.

9. The computer system of claim 2, wherein the latent transformer operates over cluster-level embeddings produced by the codeword clustering module.

10. The computer system of claim 1, wherein the intermediate reasoning steps are identified by scanning hidden states for activation transitions and projecting them via a learned matrix before codeword encoding.

11. A computer-implemented method comprising the steps of:

- tokenizing a set of training data into a plurality of training tokens;
- creating a codeword dictionary by assigning unique codewords to each of the plurality of training tokens;
- converting all training tokens into a plurality of training codewords using the codeword dictionary;
- training a large codeword model using the plurality of training codewords;
- receiving a plurality of prompt codewords;
- processing the plurality of prompt codewords through the large codeword model to generate a plurality of thought codewords representing intermediate reasoning steps; and
- processing the sequence of prompt codewords together with the plurality of thought codewords through the large codeword model to generate a codeword response.

12. The computer-implemented method of claim 11, wherein the large codeword model uses a latent transformer architecture.

13. The computer-implemented method of claim 11, wherein conversion between tokens and codewords for a user prompt is performed on an edge device using a local codeword dictionary lookup, and only codewords are transmitted to the large codeword model.

14. The computer-implemented method of claim 11, further comprising a plurality of language-specific codebooks and a codeword translator configured to map codewords between different language codebooks.

15. The computer-implemented method of claim 11, wherein the large codeword model includes a codeword clustering module that groups semantically related codewords and learns a single embedding per cluster.

16. The computer-implemented method of claim 11, wherein the model comprises multiple embedding layers respectively configured for different input modalities and a concatenation stage that forms a unified sequence for transformer processing.

17. The computer-implemented method of claim 11, further comprising a thought association layer configured to (i) segment the prompt into semantic portions, (ii) associate each thought codeword with at least one segment, and (iii) compute a relevance score for each association.

18. The computer-implemented method of claim 11, wherein a thought cache stores thought codewords together with (a) a reasoning-chain index recording prerequisite, supporting, or contradictory relationships among thoughts, and (b) cross-references enabling retrieval of complete reasoning sequences.

19. The computer-implemented method of claim 12, wherein the latent transformer operates over cluster-level embeddings produced by the codeword clustering module.

20. The computer-implemented method of claim 11, wherein the intermediate reasoning steps are identified by scanning hidden states for activation transitions and projecting them via a learned matrix before codeword encoding.

* * * * *